United States Patent

Miki et al.

[11] Patent Number: 5,960,939
[45] Date of Patent: Oct. 5, 1999

[54] POSITION DETECTING, ROTARY SWITCH WITH MOVABLE CONTACT-ROTOR ASSEMBLY INCLUDING RELATIVE ROTARY MOMENT INHIBITING STRUCTURE

[75] Inventors: Nobuaki Miki; Takenori Kano; Takuo Shimizu; Takuji Akiyama; Munetaka Torii, all of Anjo, Japan

[73] Assignee: Aisin AW Co., Ltd., Japan

[21] Appl. No.: 08/951,604

[22] Filed: Oct. 17, 1997

[30] Foreign Application Priority Data

Oct. 18, 1996 [JP] Japan .................................. H8-276167

[51] Int. Cl.⁶ ............................ H01H 1/44; H01H 19/58; H01H 21/18; H01H 1/50
[52] U.S. Cl. ....................... 200/257; 200/11 J; 200/11 K; 200/16 C; 200/61.91; 200/260; 200/571
[58] Field of Search ............................ 200/11 R–11 TW, 200/61.52, 61.85–61.91, 252, 258–261, 571, 16 C, 257

[56] References Cited

U.S. PATENT DOCUMENTS

| | | | |
|---|---|---|---|
| 3,442,004 | 5/1969 | Schink | 29/622 |
| 3,531,603 | 9/1970 | Ashman | 200/11 D |
| 3,602,656 | 8/1971 | Graddy et al. | 200/11 C |
| 3,703,613 | 11/1972 | Abel | 200/11 TW |
| 3,778,572 | 12/1973 | Matsui et al. | 200/61.52 |
| 3,939,313 | 2/1976 | Hayashi et al. | 200/11 J |
| 4,897,513 | 1/1990 | Oka et al. | 200/11 EA |
| 5,023,414 | 6/1991 | Mihara et al. | 200/11 J X |
| 5,679,937 | 10/1997 | Iwata | 200/61.88 |
| 5,692,600 | 12/1997 | Bradshaw | 200/571 |

*Primary Examiner*—J. R. Scott
*Attorney, Agent, or Firm*—Lorusso & Loud

[57] ABSTRACT

In a position detecting switch, a first movable contact is disposed in a first receptacle formed in a sliding body and is urged toward a casing member by a first spring so as to engage first and second stationary contacts mounted in the casing member when the sliding body is in a selected position. In order to prevent non-contact due to rotating moment of the first movable contact relative to the stationary contacts one or more features for inhibiting or reducing the relative moment are provided such as: (1) The first and second stationary contacts can be urged toward the first movable contact by fourth and fifth springs. (2) An elastic member or members can be disposed in a clearance between end walls of the sliding body and walls of the first receptacle. (3) The first spring can be restrained to apply its load to a substantially middle portion of the movable contact. (4) A plurality of the first springs can be provided to apply load the movable contact at a plurality of locations in a lengthwise direction. (5) An interval between the first and second stationary contacts can be increased. (6) An auxiliary receptacle member can be provided in the contact receptacle in the sliding body. (7) A lid can be disposed in the opening of the contact receptacle and have an opening larger than the movable contact but smaller than the contact receptacle.

18 Claims, 16 Drawing Sheets

OUT OF CONTACT

POSITION DETECTING, ROTARY SWITCH WITH MOVABLE CONTACT-ROTOR ASSEMBLY INCLUDING RELATIVE ROTARY MOMENT INHIBITING STRUCTURE

The entire disclosure of Japanese Patent Application No. Hei 8-276167 filed on Oct. 18, 1996 including the specification, drawings and abstract is incorporated herein by reference in its entirety.

BACKGROUND OF THE INVENTION

1. Field of the Invention

The present invention relates to a position detecting switch for detecting the position of an operating member selecting a range among a plurality of ranges and, more particularly, to a position detecting switch that detects the operating member position by a movable contact point, movable cooperatively with range shift operation of an operating member, contacting a stationary contact point corresponding to the selected range.

2. Description of the Related Art

In a motor vehicle, a driver operates a shift lever to select one of six or seven ranges of an automatic transmission to control vehicle running conditions. These ranges typically include a parking range (hereinafter, referred to also as "P range"), a reverse range (hereinafter, referred to as "R range"), a neutral range (hereinafter, referred to as "N range"), a drive range (hereinafter, referred to as "D range"), a second speed range (hereinafter, referred to also as "2nd range"), and a first speed range (hereinafter, referred to as "L range"). A position detecting switch is provided for detecting the shift lever range position selected by the driver to control the automotive automatic transmission. Such a position detecting switch is normally mounted directly on the automatic transmission (hereinafter, referred to also as "AT").

The position detecting switch has a plurality of range positions corresponding to the ranges of the automatic transmission. When a driver selects a transmission range, the position detecting switch detects the range position and outputs a position detecting signal. Based on the position detection signal from the position detecting switch, an electronic control device formed by, for example, a microcomputer, controls the automatic transmission so as to achieve the range selected by the driver.

Examples of conventional position detecting switches of the contact-type are disclosed in Japanese Patent Laid-Open Nos. Hei 8-64077 and 8-64077 wherein movable contacts are pressed against stationary contacts so that electrical conduction is established by contact between the movable and stationary contacts to signal the position of the shift lever.

A conventional contact-type position detecting switch is shown in FIGS. 16 and 17 and has a case body 2, a case cover 3 detachably attached to the case body 2, a rotating shaft 4 that is rotatably supported by the case body 2 and the case cover 3, and a lever-like sliding body 5 mounted for rotation with the rotating shaft 4. The shaft 4 and sliding body 5 rotate in correspondence with movement of a shift lever (not shown) operated by the driver of the automobile.

The case body 2 has a fan shape as shown in FIG. 17. The case body 2 has first and second stationary contacts 6, 7 exposed at both the P and N positions for operating as a contact pair to energize or enable an engine starter circuit, third and fourth stationary contacts 8, 9 at the R position for operating as a contact pair to energize or enable a reverse circuit, a fifth stationary contact 10 exposed at the P, R, 2nd and L positions, a sixth stationary contact 11 exposed at the R, N, D and 2nd positions, a seventh stationary contact 12 exposed at the D, 2nd and L positions, and an eighth stationary contact 13 exposed at the P and 2nd positions. The exposed portions of the stationary contacts 6–13 are shaped and arranged in the case body 2 substantially as concentric arcs about the rotating axis of the rotating shaft 4 disposed in a pivot portion of the fan-shaped case body 2. In this position detecting switch 1, the stationary contacts 10, 11, 12 and 13 in the case body 2 at each of the P, R, N, D, 2nd and L positions are selectively grounded to the case body 2 to generate codes forming position detection signals indicating the selected range position. Thereby the positions for the P, R, N, D, 2nd and L ranges are determined.

The case cover 3 also has a fan shape and defines a fan-shaped space 15 inside the case cover 3. The sliding body 5 is disposed in the space 15 for rotation with the rotating shaft 4.

As shown in FIG. 16, the sliding body 5 has first, second and third cavities or sliding contact receptacle portions 16, 17, 18 that are aligned in a radial direction. First, second and third movable contacts 19, 20, 21 are slidably fitted in the contact receptacle portions 16, 17, 18, respectively, for sliding movement normal to the plane within which the sliding body 5 rotates. The movable contacts 19, 20, 21 are constantly urged from contact receptacle portions 16, 17, 18 into engagement with the case body 2 and the stationary contacts 6–13 by first, second and third coil springs 22, 23, 24, respectively.

When the sliding body 5 is set to the P range position, the first movable contact 19 contacts the first and second stationary contacts 6, 7 and electrically connects the first and second stationary contacts 6, 7, to turn on the starter circuit, thereby establishing a state where the engine is allowed to be started. Simultaneously, the second movable contact 20 contacts the fifth stationary contact 10, and the third movable contact 21 contacts the eighth stationary contact 13, so that the fifth and eighth stationary contacts 10, 13 are electrically connected to the case body 2. Thereby, a position detection signal for the P range of the position circuit is output.

When the sliding body 5 is set to the R range, the first movable contact 19 contacts the third and fourth stationary contacts 8, 9 and electrically connects the third and fourth stationary contacts 8, 9, to turn on the reverse circuit. Simultaneously, the second movable contact 20 contacts the fifth and sixth stationary contacts 10, 11 to electrically connect the fifth and sixth stationary contacts 10, 11 to the case body 2. Thereby, a position detection signal for the R range of the position circuit is output.

When the sliding body 5 is set to the N range position, the first movable contact 19 contacts the first and second stationary contacts 6, 7 and electrically connects the first and second stationary contacts 6, 7, to turn on the starter circuit, thereby allowing the engine to be started, as in the case of the P range. Simultaneously, the second movable contact 20 contacts the sixth stationary contact 11, and the third movable contact 21 contacts the eighth stationary contact 13, so that the sixth and eighth stationary contacts 11, 13 are electrically connected to the case body 2. Thereby, a position detection signal for the N range of the position circuit is output.

When the sliding body 5 is set to the D range, the second movable contact 20 contacts the sixth stationary contact 11, and the third movable contact 21 contacts the seventh stationary contact 12, so that the sixth and seventh stationary contacts 11, 12 are electrically connected to the case body 2. Thereby, a position detection signal of the D range of the position circuit is output.

When the sliding body 5 is set to the 2nd range, the second movable contact 20 contacts the fifth and sixth stationary contact 10, 11, and the third movable contact 21 contacts the seventh and eighth stationary contacts 12, 13, so that the fifth, sixth, seventh and eighth stationary contacts 10, 11, 12, 13 are electrically connected. Thereby, a position detection signal of the 2nd range of the position circuit is output.

When the sliding body 5 is set to the L range, the second movable contact 20 contacts the fifth stationary contact 10, and the third movable contact 21 contacts the seventh stationary contact 12, so that the fifth and seventh stationary contacts 10, 12 are electrically connected to the case body 2. Thereby, a position detection signal of the L range of the position circuit is output.

Thus, the range position of the position detecting switch, that is, the range set by a driver, is detected in accordance with the connection between the movable contacts 19, 20, 21 and the stationary contacts 6, 7, 8, 9, 10, 11, 12, 13.

In the above-described contact-type position detecting switch 1, as shown in FIG. 18, inside opposite end wall surfaces 16a, 16b of the first contact receptacle 16 in the sliding body 5 are inclined with a draft taper angle α, for processing and assembly reasons. The inside opposite end wall surfaces 16a, 16b face in the direction of the length of the sliding body 5 and retain the first movable contact 19 against movement along the length of the sliding body 5. The inside length dimension of the first contact receptacle 16 gradually increases progressing from the innermost wall surface of the first movable contact receptacle portion 16 toward the first and second stationary contacts 6, 7. Although not shown, the second and third movable contact receptacle portions 17, 18 are similarly formed with a draft taper angle α.

However, the foregoing conventional contact-type position detecting switch 1 is designed to be mounted directly on an automatic transmission. Therefore, the position detecting switch 1 is placed in a thermally tough environment where it receives heat from the automatic transmission. Because of the thermal effect of the automatic transmission, the sliding body 5 deforms through thermal expansion and contraction. If the sliding body 5, for example, thermally contracts in a direction indicated by an arrow in FIG. 19, an inside wall surface 16a of the first movable contact receptacle portion 16 may engage one outside wall surface 19a of opposite end wall surfaces 19a, 19b of the movable contact 19 facing lengthwise, at a point β at a height h above the top surfaces of the first and second stationary contacts 6, 7.

When the first contact receptacle wall 16a engages the first movable contact 19, an external force F is applied by the first contact receptacle wall 16a to the end wall 16a of the first movable contact 19 at the point β. Due to friction resistance between the first movable contact 19 and the first and second stationary contacts 6, 7, the external force F causes a rotating moment M in the first movable contact 19, whereby the first movable contact 19 pivots about point γ at a corner portion of the second stationary contact 7 and the bottom contact engaging surface of the contact 19 becomes inclined with respect to the plane of contacts 6 and 7. Thereby, the first movable contact 19 is held in an inclined posture by the first contact receptacle wall 16a contacting the first movable contact 19 as shown in FIG. 19. In this posture, it is likely that the first movable contact 19 will be entirely separated from the first stationary contact 6 and partially disengaged from the second stationary contact 7. Thus the first movable contact 19 fails to achieve reliable contact with the first and second stationary contacts 6, 7 and there is insufficient electric conduction between the contacts 6, 7 and 19.

Furthermore, there may occur an imbalance of load by a first spring 22, as shown in FIG. 20, pressing the first movable contact 19 against the first and second stationary contacts 6, 7. Spring load imbalance can be caused when the acting center of load of the first spring 22 deviates, for example, by an amount a to the right as indicated in FIG. 20. Such a load center deviation also causes a rotating moment M in the first movable contact 19, whereby the first movable contact 19 may well become inclined and fail to achieve reliable contact with the first and second stationary contacts 6, 7 thus failing to achieve sufficient electric conduction between the contacts 6, 7 and 19.

Further, the interval L between the first and second stationary contacts 6, 7 is relatively small as indicated in FIG. 21, the seating of the first movable contact 19 on the first and second stationary contacts 6, 7 may become unstable, increasing the likelihood that the first movable contact 19 will incline. If this happens, reliable contact between the first movable contact 19 and the first and second stationary contacts 6, 7 will fail and, therefore, sufficient electric conduction between the contacts 6, 7 and 19 will not be achieved.

The aforementioned problems with the first movable contact 19 illustrated in FIGS. 19–21 can also occur to the second and third movable contacts 20, 21.

SUMMARY OF THE INVENTION

Accordingly, it is an object of the present invention to provide a position detecting switch that achieves a sufficient electrical conduction between a movable contact and a stationary contact by ensuring reliable contact between the contacts without the danger of being adversely affected by thermal expansion or thermal contraction of a sliding body, or deviation of the center of spring load to the movable contact, or the magnitude of the interval between a pair of stationary contacts.

According to an aspect of the present invention, there is provided a position detecting switch including a substantially stationary contact provided on a casing at a predetermined position; and a movable contact disposed in a contact receptacle portion formed in a sliding body. The movable contact is carried by the sliding body so as to engage the substantially stationary contact when the sliding body is in a selected position and to disengage the substantially stationary contact when the sliding body is moves from the select position. A relative rotating moment inhibiting feature is provided for inhibiting occurrence of a rotating moment of the movable contact relative to the substantially stationary contact to prevent non-contact when the sliding body is in the selected position.

The relative rotating moment inhibiting device inhibits occurrence of rotating moment which is conventionally caused in a movable contact by thermal expansion or thermal contraction of a sliding body, a deviation of the load center of an urging device that urges the movable contact toward stationary contacts, a relatively small interval between the stationary contacts, or the like. The present invention substantially prevents the movable contact from turning relative to the substantially stationary contacts (hereinafter, referred to merely as "stationary contact") and, therefore, substantially prevents the movable contact from separating from the stationary contact when the contacts are in contact position, thereby achieving reliable contact between the movable contact and the stationary contact. Therefore, it becomes possible to reliably achieve sufficient electrical conduction between the movable contact and the stationary contact.

The relative rotating moment inhibiting device may include the stationary contact slidingly disposed in the casing so that the stationary contact can be moved a predetermined amount toward the movable contact, and an elastic device for urging the stationary contact toward the movable contact.

With this construction of the relative rotating moment inhibiting device, the elastic device actually presses the stationary contact toward the movable contact, thereby more reliably inhibiting occurrence of rotating moment in the movable contact relative to the stationary contact.

The rotating moment inhibiting device may include a predetermined amount of clearance formed in a direction of a length of the sliding body between the movable contact receptacle portion of the sliding body and the movable contact, and an elastic device disposed in the clearance With this construction, the elastic device disposed in the lengthwise clearance between the movable contact and the stationary contact substantially prevents a wall of the movable contact receptacle portion from abutting against the movable contact, thereby more reliably inhibiting occurrence of rotating moment in the movable contact.

The position detecting switch of the invention may further include an elastic device for urging the movable contact toward the stationary contact, wherein the rotating moment inhibiting device includes a device for constantly applying a load of the elastic device to a substantially lengthwise middle portion of the movable contact.

With this construction, the load of the elastic device is constantly applied to a substantially lengthwise middle portion of the movable contact, thereby substantially preventing deviation of the load center of the elastic device. Therefore, it becomes possible to more reliably inhibit occurrence of rotating moment in the movable contact.

The position detecting switch of the present invention may include an elastic device for urging the movable contact toward the stationary contact, wherein the rotating moment inhibiting device applies a load of the elastic device to the movable contact at a plurality of locations in a lengthwise direction.

With this construction, the load of the elastic device is constantly applied to the movable contact at a plurality of locations in the lengthwise direction, thereby enabling reliable application of contact load from the movable contact to opposite sides of the stationary contact. Furthermore, since the load of the elastic device is applied to the movable contact at a plurality of locations, the interval between stationary contacts can be increased, thereby ensuring stable seating of the movable contact on the stationary contacts.

A plural number of the stationary contact may be provided so that the movable contact simultaneously contacts two of the plurality of substantially stationary contacts. Further, the rotating moment inhibiting device may increase an interval between contact positions at which the movable contact respectively contacts the two substantially stationary contacts.

If the interval between contact positions is increased, the movable contact can be reliably seated onto the stationary contacts with an increased stability.

In this construction, the movable contact may be angled at a predetermined angle relative to a direction of a length of the sliding body.

The movable contact is aligned on a line intersecting a line in the direction of the length of the sliding body at a predetermined angle, so that the interval between the contact positions between the movable contact and the stationary contacts can be increased while the interval between the stationary contacts remains the same as in the conventional art. Therefore, it becomes possible to form a position detecting switch according to the present invention without substantially changing the installation space and the construction of the position detecting switch from those of a conventional position detecting switch. Furthermore, since the thermal expansion or thermal contraction of the sliding body occurs in the lengthwise direction to a great extent, placement of the movable contact at a predetermined angle to the direction of the length of the sliding body reduces the influence of thermal expansion or thermal contraction of the sliding body.

The predetermined angle may be 90°.

Such right-angled placement of the movable contact relative to the sliding body enables an increase of the interval between the stationary contacts, thereby considerably increasing the stability of the seating of the movable contact on the stationary contact.

The rotating moment inhibiting device may include an auxiliary receptacle member which is provided in the contact receptacle portion of the sliding body, with a predetermined clearance in the direction of the length of the sliding body. The movable contact is received by the auxiliary receptacle member.

The movable contact is thereby disposed in the movable contact receptacle portion using the auxiliary receptacle member having a predetermined clearance in the direction of the length of the sliding body, from a surface of the movable contact receptacle portion. Therefore, the effect of thermal expansion and thermal contraction of the sliding body can be absorbed by the auxiliary receptacle member, so that the thermal effect is substantially prevented from affecting the movable contact.

According to another aspect of the present invention, there is provided a position detecting switch including a substantially stationary contact provided corresponding to a predetermined position, and a movable contact disposed in a movable contact receptacle portion formed in a sliding body. The movable contact is movable together with the sliding body so as to contact and separate from the substantially stationary contact. A rotating moment reducing device is provided for reducing a rotating moment that turns the movable contact relative to the substantially stationary contact.

The rotating moment reducing device reduces occurrence of rotating moment, which is conventionally caused in a movable contact by thermal expansion or thermal contraction of a sliding body. The present invention substantially prevents the movable contact from turning relative to the stationary contacts (hereinafter, referred to merely as "stationary contact") and, therefore, substantially prevents the movable contact from separating from the stationary contact when the contacts are in contact position, thereby achieving reliable contact between the movable contact and the stationary contact. Therefore, it becomes possible to reliably achieve sufficient electrical conduction between the movable contact and the stationary contact.

The rotating moment inhibiting device may include a lid disposed in an opening portion of the movable contact receptacle portion. The lid has an opening which has a length that is greater by a first predetermined amount than a length of the movable contact in a lengthwise direction, and which has a length that is less by a second predetermined amount than a length of the opening portion of the movable contact receptacle portion in the lengthwise direction.

The lid provided with the opening, through which the movable contact extends, allows a reduction of the rotating moment that is conventionally caused in a movable contact by thermal expansion or thermal contraction of a sliding body, while employing a simple construction. Since this construction according to the present invention can be achieved simply by disposing the lid in an opening portion of a movable contact receptacle portion of a sliding body in a conventional position detecting switch, a position detecting switch according to the present invention can be easily formed at a low cost without changing component parts of a conventional position detecting switch.

According to still another aspect of the present invention, there is provided a position detecting switch including a substantially stationary contact provided corresponding to a predetermined position, and a movable contact disposed in a movable contact receptacle portion formed in a sliding body.

The movable contact is movable together with the sliding body so as to contact and separate from the substantially stationary contact. An oscillating device is provided for oscillating the position detecting switch.

The position detecting switch is oscillated by the oscillating device. Therefore, even if a wall surface of the movable contact receptacle portion contacts the movable contact so as to cause a rotating moment in the movable contact, the movable contact is released from the contact with the wall surface of the movable contact receptacle portion by oscillation of the position detecting switch. Thereby, the position detecting switch achieves reliable contact between the movable contact and the stationary contact and, therefore, reliably achieves sufficient electrical conduction between the movable contact and the stationary contact.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 10b illustrates a modified portion of the range position switch shown in FIG. 10a;

FIG. 11b is a sectional view of a modification of the range position switch shown in FIG. 11a;

FIG. 13b is a sectional view taken on plane XIIIB—XIIIB indicated in FIG. 13a;

FIG. 15b is a sectional view taken on plane XVB—XVB indicated in FIG. 15a;

DETAILED DESCRIPTION OF PREFERRED EMBODIMENTS

Figure 16:
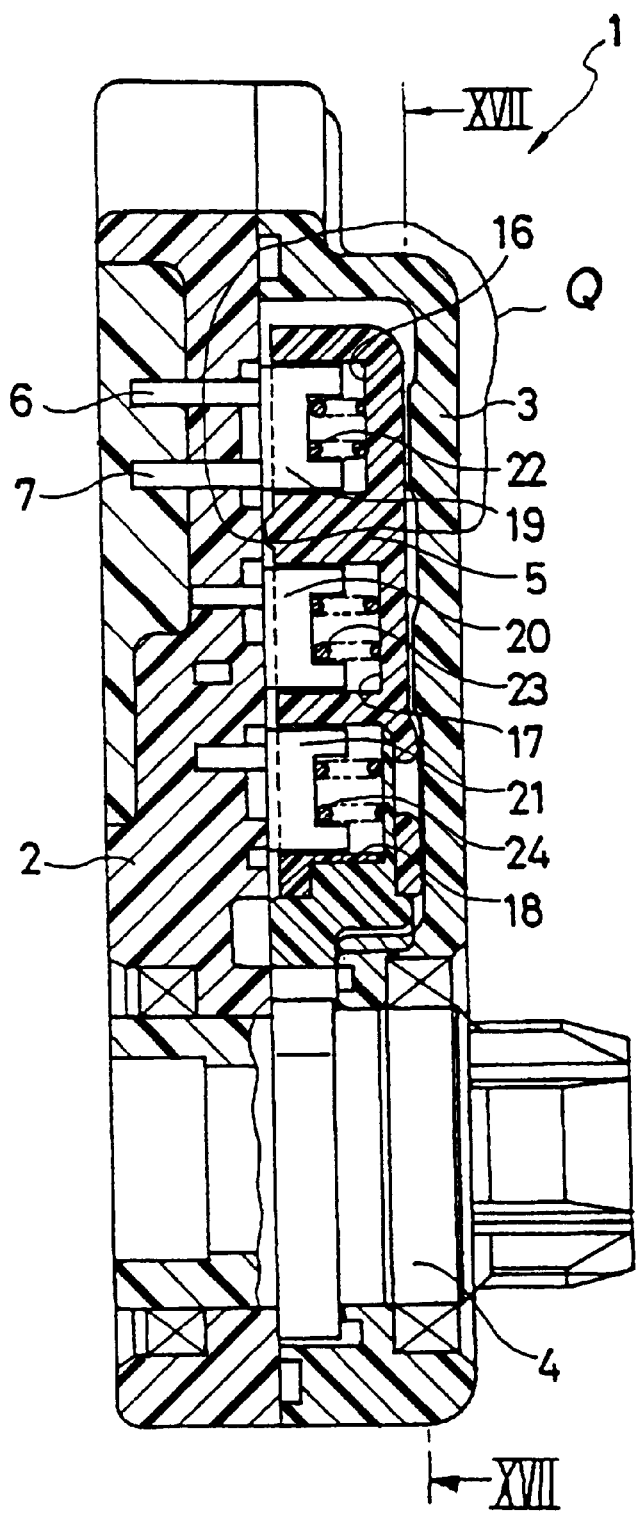
FIG. 16 is a sectional view of a conventional position detecting switch for an automatic transmission.
Figure 17:
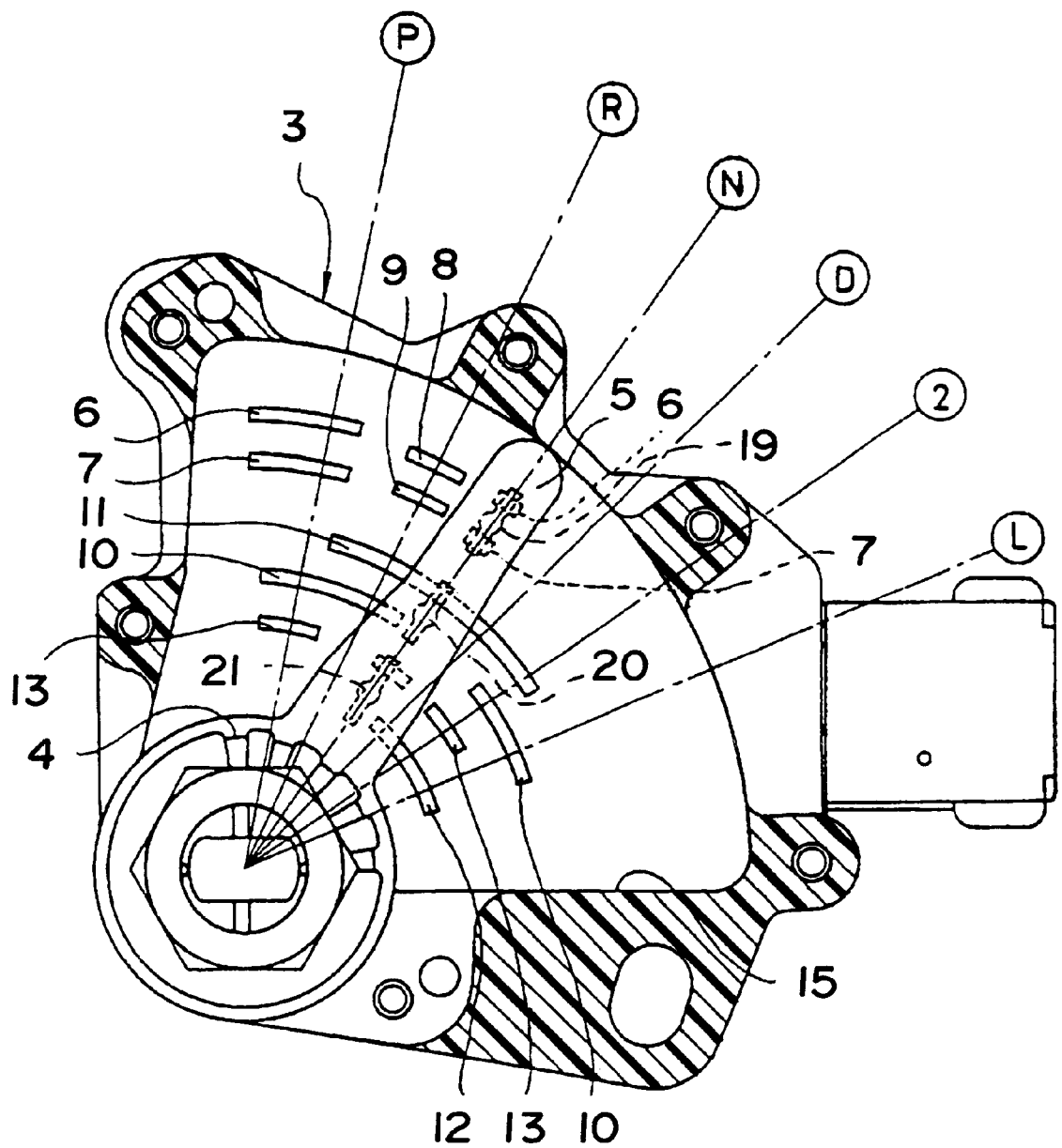
FIG. 17 is a sectional view taken on plane XVII—XVII indicated in FIG. 16.

Preferred embodiments of the present invention will be described in detail hereinafter with reference to the accompanying drawings. Portions and constructions of preferred embodiments comparable to those of the conventional position detecting switch described above with reference to FIGS. 16–18 are represented by comparable reference numerals and will not be described in detail again.

Figure 1:
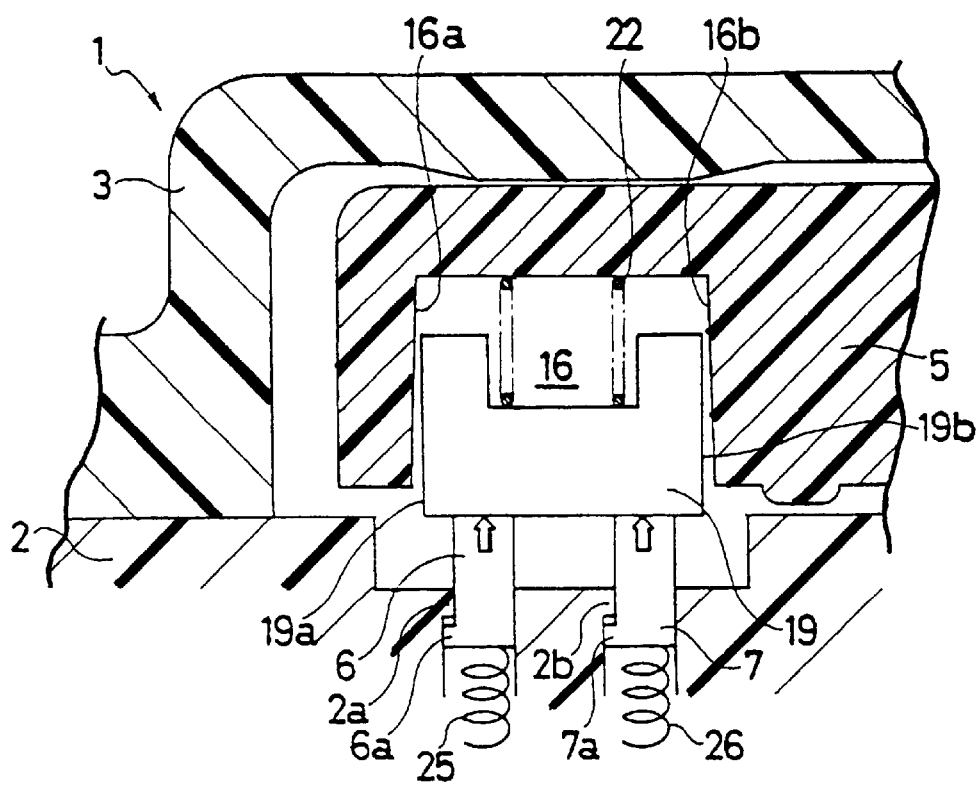
FIG. 1 is a sectional view of a broken-away portion of a range position detecting switch in an automatic transmission in accordance with one embodiment of the present invention.
Figure 18:
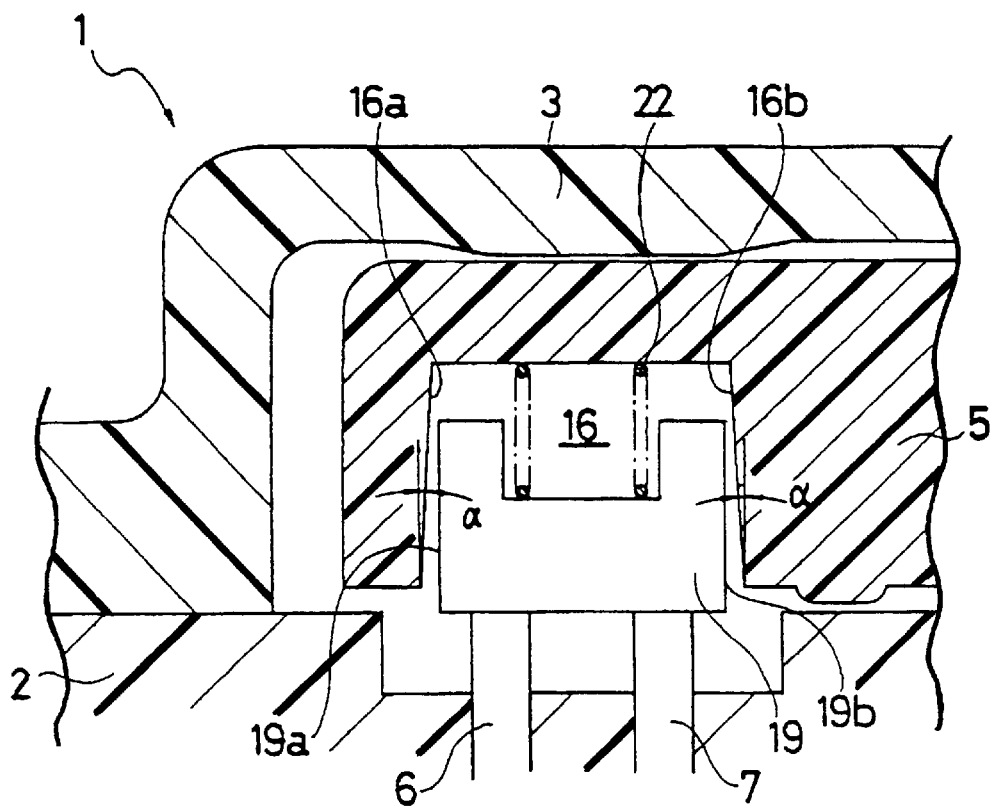
FIG. 18 is an enlarged sectional view of a portion Q of the position detecting switch shown in FIG. 16.
Figure 19:
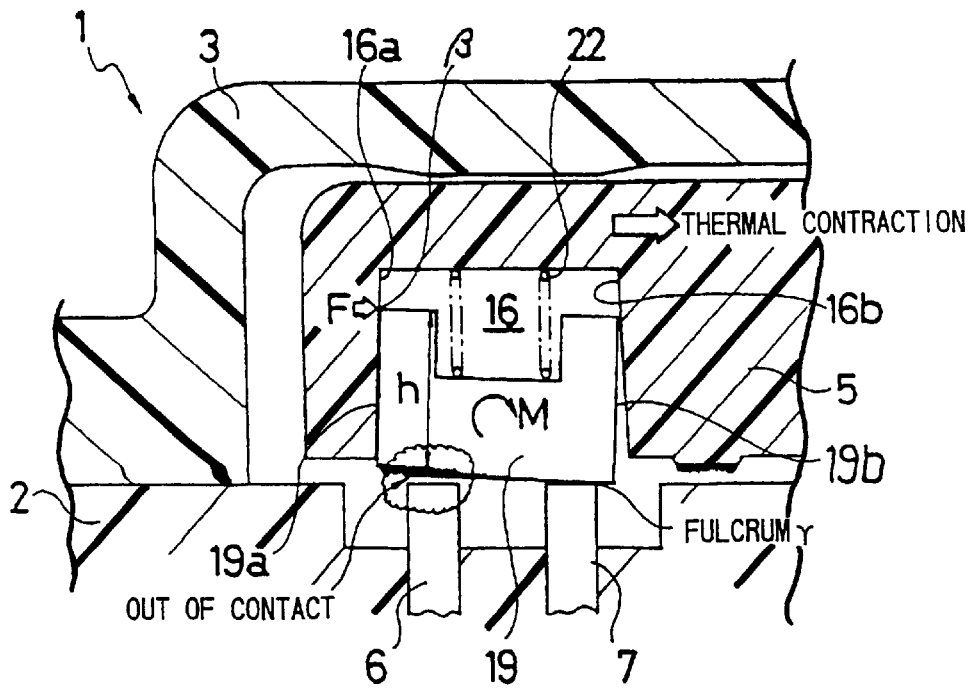
FIG. 19 is a sectional view similar to FIG. 18 illustrating a first problem of the conventional position detecting switch.
Figure 20:
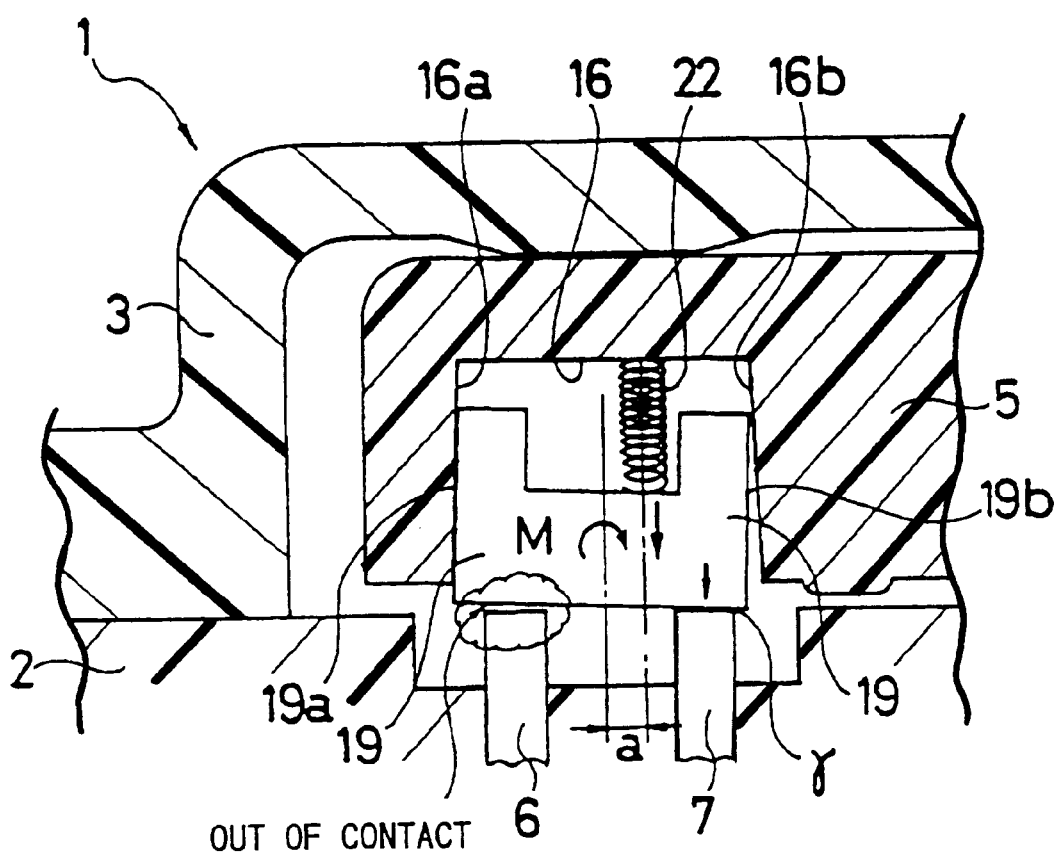
FIG. 20 is a sectional view similar to FIG. 19 but illustrating a second problem of the conventional position detecting switch.
Figure 21:
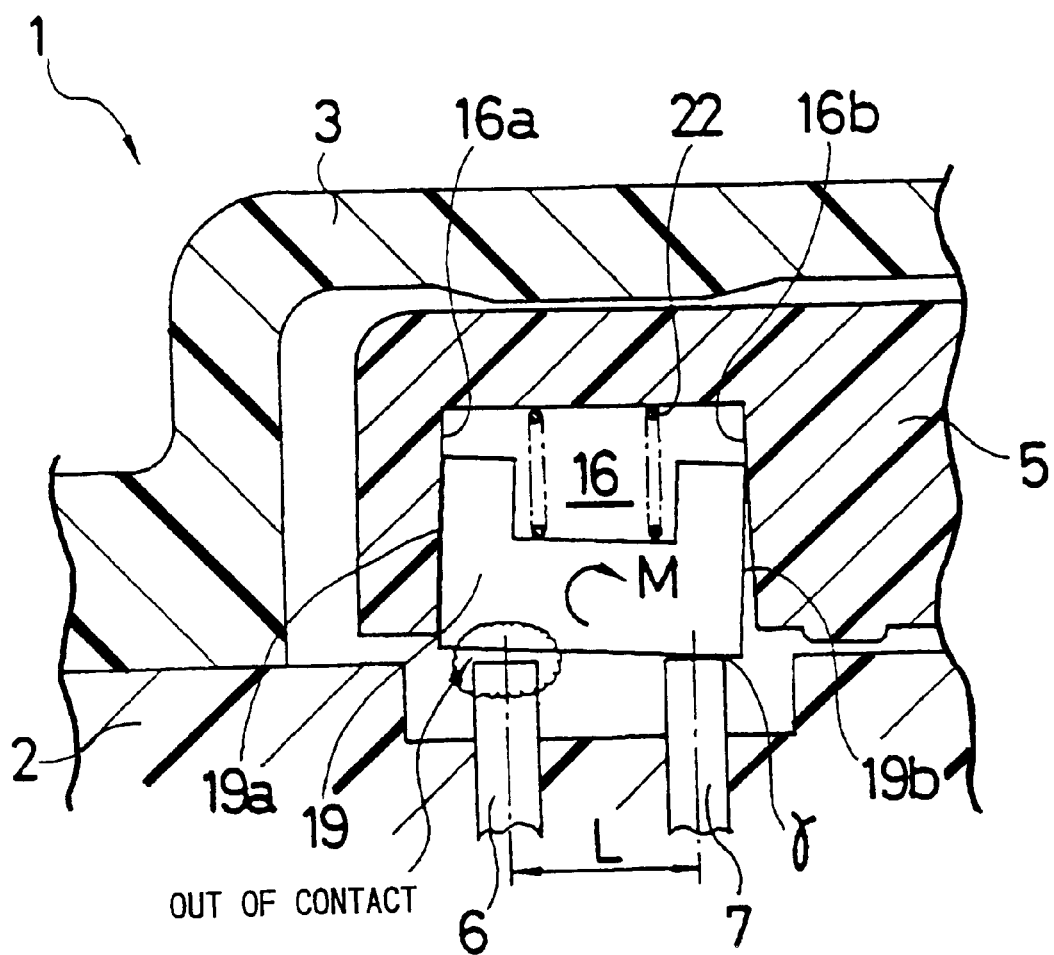
FIG. 21 is a sectional similar to FIGS. 19 and 20 but illustrating a third problem of the conventional position detecting switch.

FIG. 1 shows an embodiment of the present invention applied to a position detecting switch for detecting range positions in an automatic transmission, similar to the view of FIG. 18. First and second stationary contacts 6, 7 are disposed in a case body 2 in such a manner that the first and second stationary contacts 6, 7 are slidable reciprocally toward and away from a first movable contact 19. The first and second stationary contacts 6, 7 are constantly urged by fourth and fifth springs 25, 26, respectively, toward the first movable contact 19. Although the first and second stationary contacts 6, 7 are actually movable as described above, the first and second stationary contacts 6, 7 are not movable from one range position to another. Therefore, the term "stationary" is used for the first and second stationary contacts 6, 7 for convenience sake and/or in the sense that these contacts are stationary in directions parallel to the plane of movement of the sliding body 5.

Portions of the case body 2 that slidingly contact the first and second stationary contacts 6, 7 are provided with stops 2a, 2b, respectively. The stops 2a, 2b engage projections 6a, 7a formed on the first and second stationary contacts 6, 7 to limit the amount of movement of the first and second stationary contacts 6, 7 toward the first movable contact 19.

Although not shown in FIG. 1, third to eighth stationary contacts 8, 9, 10, 11, 12, 13 are formed similarly to the first and second stationary contacts 6, 7 of FIG. 1. The remaining structure of the position detecting switch 1 of the embodiment of FIG. 1 is substantially the same as described for the conventional position detecting switch 1 of FIGS. 16 and 17.

In the position detecting switch 1 of FIG. 1, the first and second stationary contacts 6, 7 are constantly urged toward the first movable contact 19 by the fourth and fifth springs 25, 26. Therefore, the first and second stationary contacts 6, 7 are pressed against the first movable contact 19 by loads from the fourth and fifth springs 25, 26 when the first movable contact 19 is moved onto the first and second stationary contacts 6, 7.

Loads from the fourth and fifth springs 25, 26 substantially prevent occurrence of rotating moment M that is conventionally caused in the movable contact 19 by thermal expansion or thermal contraction of the sliding body 5, a deviation of the load center of the first spring 22, or a relatively small interval between the first and second stationary contacts 6, 7, or the like. Therefore, the movable contact 19 is substantially prevented from non-contact with the first and second stationary contacts 6, 7 when the contacts are in contact position, so that the movable contact 19 reliably contacts the first and second stationary contacts 6, 7. Therefore, this embodiment reliably achieves sufficient electrical conduction between the movable contact 19 and the first and second stationary contacts 6, 7.

In a similar manner, sufficient electrical conduction between second and third movable contacts 20, 21 (not shown in FIG. 1) and the corresponding stationary contacts can be achieved.

Figure 2:
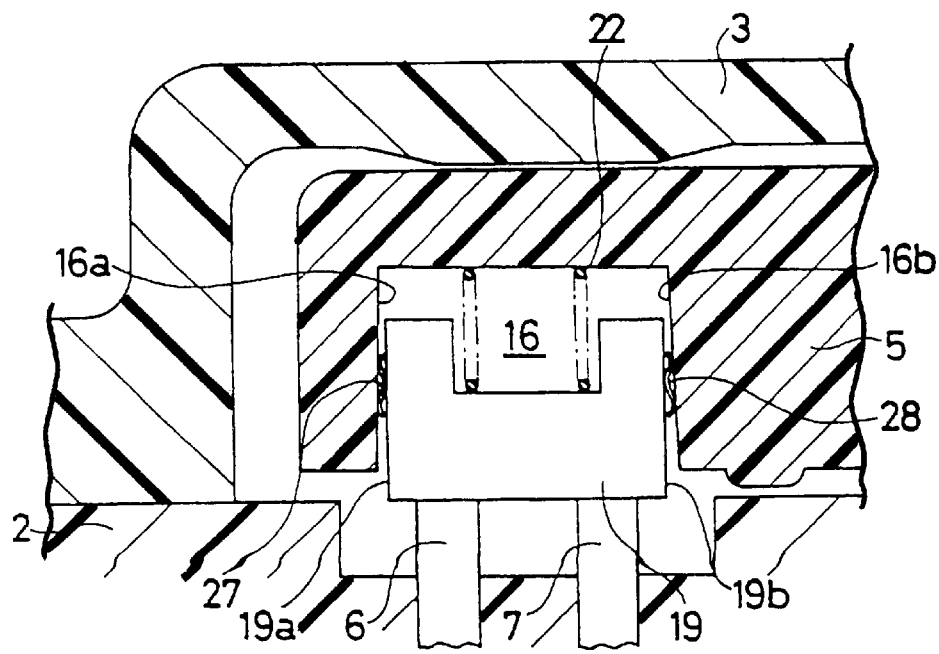
FIG. 2 is a sectional view similar to FIG. 1 but in accordance with a second preferred embodiment of the present invention.

In a second embodiment of the position detecting switch of the present invention shown in FIG. 2, first and second leaf springs 27, 28 are disposed in spaces or clearances between opposite outside wall surfaces 19a, 19b of a first movable contact 19 and opposite inside wall surfaces 16a, 16b of a first movable contact receptacle portion 16. The movable contact wall surfaces 19a, 19b and the receptacle wall surfaces 16a, 16b are transverse or perpendicular to the longitudinal dimension of the movable contact 19 which extends in the radial direction of the rotating sliding body 5, i.e., the movable contact wall surfaces 19a, 19b and the receptacle wall surfaces 16a, 16b face in the directions of the length of a sliding body 5. Second and third movable contacts 20, 21 (not shown in FIG. 2) are formed and disposed substantially the same manner as the first movable contact 19. Remaining structure of the position detecting switch of FIG. 2 is substantially the same as that of the above-described conventional position detecting switch 1 of FIGS. 16 and 17.

In the position detecting switch of FIG. 2, the first and second leaf springs 27, 28, disposed between the opposite outside wall surfaces 19a, 19b of the first movable contact 19 and the opposite inside wall surfaces 16a, 16b of the first movable contact receptacle portion 16, substantially prevent the first movable contact 19 from contacting either one of the opposite inside wall surfaces 16a, 16b of the first movable contact receptacle portion 16. Since the first movable contact 19 is thus prevented from contacting a wall of the first movable contact receptacle portion 16, an external force F caused at the time of deformation of the sliding body 5 due to thermal expansion or thermal contraction will not act on the first movable contact 19 and, therefore, a rotating moment M will not occur in the first movable contact 19. Therefore, even if the sliding body 5 thermally expands or contracts, the first movable contact 19 will not incline, so that the movable contact 19 will reliably contact the first and second stationary contacts 6, 7, thereby achieving sufficient electrical conduction between the movable contact 19 and the first and second stationary contacts 6, 7.

Even if the first movable contact 19 is urged to incline due to a deviation of the load center of the first spring 22 or a relatively small interval between the first and second stationary contacts 6, 7, or the like, the first and second leaf springs 27, 28 substantially prevent the first movable contact 19 from inclining. The first movable contact 19 firmly contacts the first and second stationary contacts 6, 7, thereby achieving sufficient electrical conduction between the movable contact 19 and the first and second stationary contacts 6, 7.

In a similar manner, sufficient electrical conduction between the second and third movable contacts 20, 21 and the corresponding stationary contacts can be achieved.

Figure 3:
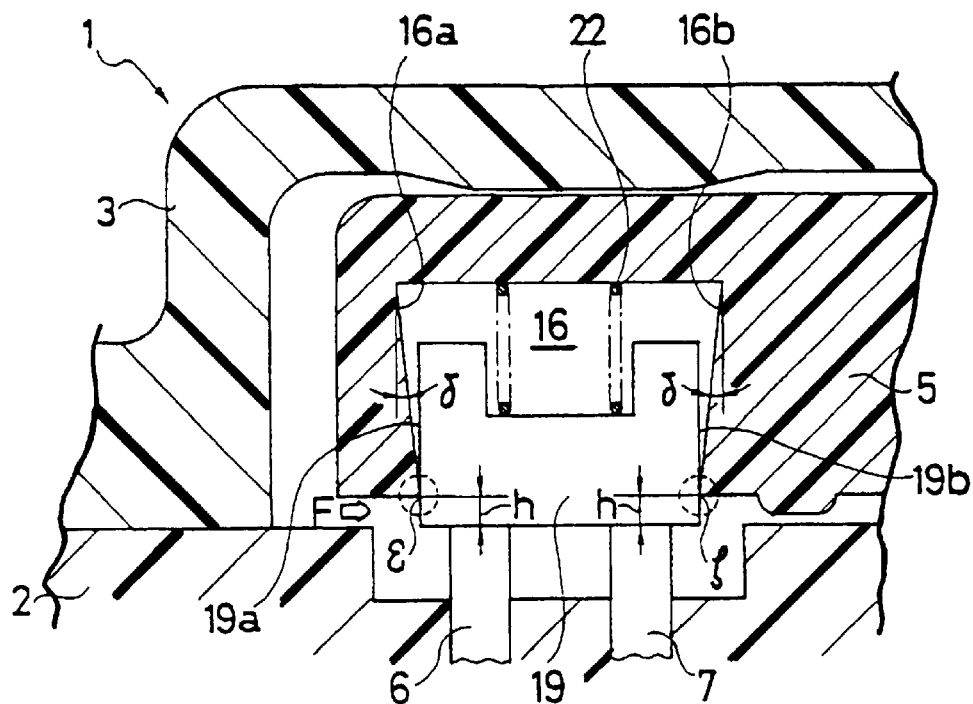
FIG. 3 is a sectional view similar to FIG. 1 but in accordance with a third preferred embodiment of the present invention.

In a third embodiment of the position detecting switch of the present invention shown in FIG. 3, opposite inside wall surfaces 16a, 16b of a first contact receptacle portion 16 of a sliding body 5 are inclined at an inclination angle δ that is opposite in inclining direction to the aforementioned draft taper angle α indicated in FIG. 18. The inclination angle δ of each of the opposite inside wall surfaces 16a, 16b reduces the height h above the first and second stationary contacts 6, 7 of a point ε or ζ where force F is applied from the sliding body 5 to the first movable contact due to thermal contraction of expansion. Movements of a first movable contact 19 in directions of the length of the sliding body 5 are restricted at the points ε and ζ. Although not shown in FIG. 3, second and third movable contact receptacle portions 17, 18 are formed in substantially the same manner as the first movable contact receptacle portion 16. The remaining structure of this embodiment is substantially the same as that of the above-described conventional position detecting switch 1 of FIGS. 16 and 17.

In the position detecting switch 1 of FIG. 3 constructed with the opposite inside wall surfaces 16a, 16b of the first movable contact receptacle portion 16 angled at the inclination angle δ, an external force F caused at the time of deformation of the sliding body 5 due to thermal contraction is applied to the first movable contact 19 at the point ε at the reduced height h (that is, a lowest portion of the sliding body 5). Therefore, the rotating moment M caused in the first movable contact 19 by the external force F is greatly reduced by the reduction in height h. When the sliding body 5 deforms due to thermal expansion, an external force F is applied to the first movable contact 19 at the point ζ at the reduced height h (that is, a lowest portion of the sliding body 5) by the thermal deformation, so that the rotating moment M thereby caused in the first movable contact 19 is small. Consequently, tendency of the first movable contact 19 to incline when the sliding body 5 thermally expands or contracts is greatly reduced, thereby preventing the first movable contact 19 from moving out of contact with the first and second stationary contacts 6, 7 when the first movable contact 19 is set to such a contact position. Therefore, the movable contact 19 will reliably contact the first and second stationary contacts 6, 7, thereby achieving sufficient electrical conduction between the movable contact 19 and the first and second stationary contacts 6, 7.

In a similar manner, sufficient electrical conduction between second and third movable contacts 20, 21 (not shown in FIG. 3) and the corresponding stationary contacts can be achieved.

Figure 4:
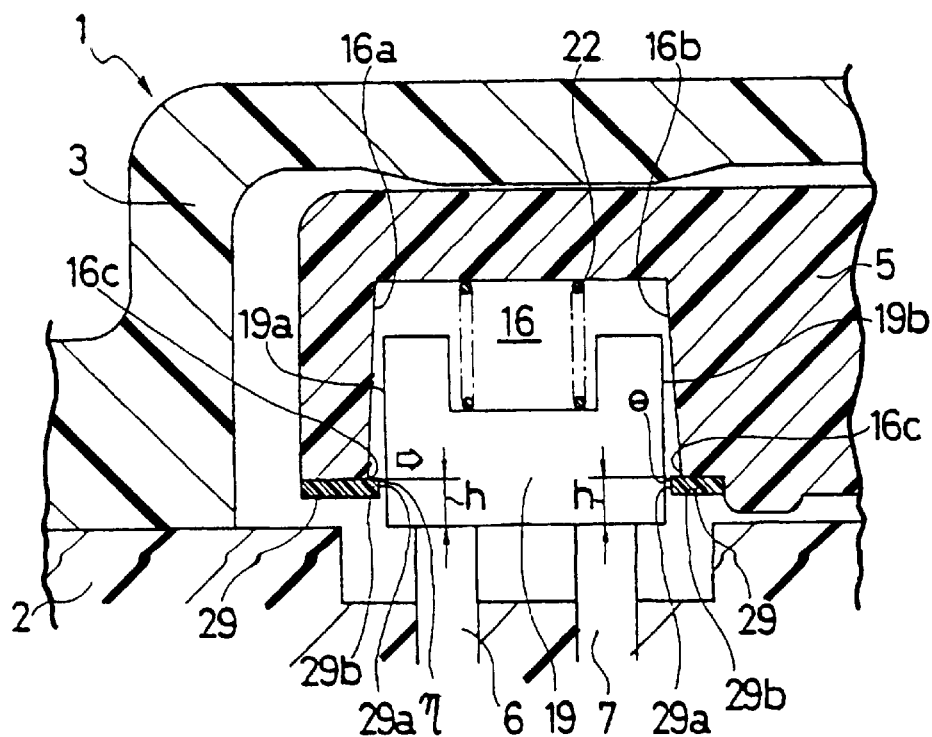
FIG. 4 is a sectional view similar to FIG. 1 but in accordance with a fourth preferred embodiment of the present invention.

In a fourth embodiment of the position detecting switch of the present invention shown in FIG. 4, an opening 16c of a first movable contact receptacle portion 16 is partially covered with a lid 29 disposed at a lowest position in a sliding body 5. The lid 29 has an opening 29a extending in the longitudinal direction of the sliding body 5. The length of the opening 29a in that lengthwise direction is preset such that the length is a predetermined amount greater than the length of the first movable contact 19 in the lengthwise direction and is a predetermined amount less than the length of the opening 16c of the first movable contact receptacle portion 16 in the lengthwise direction. Therefore, an end edge portion 29b adjacent to the opening 29a of the lid 29 protrudes a predetermined amount into the space defined by the opening 16c of the first movable contact receptacle portion 16, and the first movable contact 19 slidably extends through the opening 29a while an upper portion of the first movable contact 19 is disposed inside the first movable contact receptacle portion 16. Although not shown in FIG. 4, second and third movable contact receptacle portions 17, 18 are formed in substantially the same manner as the first movable contact receptacle portion 16. The remaining structure of the embodiment of FIG. 4 is substantially the same as that of the above-described conventional position detecting switch 1 of FIGS. 16 and 17.

In the thus-constructed position detecting switch 1 of the embodiment of FIG. 4 with the lid 29 having the opening 29a provided on the opening 16c of the first movable contact receptacle portion 16, an external force F caused at the time of deformation of the sliding body 5 due to thermal contraction is applied from the lid 29 to the first movable contact 19 at a point η at a reduced height h, so that the rotating moment M caused in the first movable contact 19 by the external force is reduced to a low level. When the sliding body 5 deforms due to thermal expansion, an external force F by the thermal deformation is applied to the first movable contact 19 at a point θ at a reduced height h, so that the rotating moment M thereby caused in the first movable contact 19 is small. In this manner, tendency of the first movable contact 19 to incline is reduced when the sliding body 5 thermally expands or contracts, thereby preventing the first movable contact 19 from moving out of the contact with the first and second stationary contacts 6, 7 when the first movable contact 19 is set to such a contact position. Therefore, the movable contact 19 will reliably contact the first and second stationary contacts 6, 7, thereby achieving sufficient electrical conduction between the movable contact 19 and the first and second stationary contacts 6, 7.

Further, the position detecting switch 1 of FIG. 4 can be formed simply by providing the lid 29 having the opening 29a formed on the opening end portion 16c of the first movable contact receptacle portion 16 of the sliding body 5. That is, the position detecting switch 1 of this embodiment can be easily formed at a low cost without a need to change the component parts of the conventional position detecting switch 1.

In a similar manner, sufficient electrical conduction between second and third movable contacts 20, 21 (not shown in FIG. 4) and the corresponding stationary contacts can be achieved.

Figure 5:
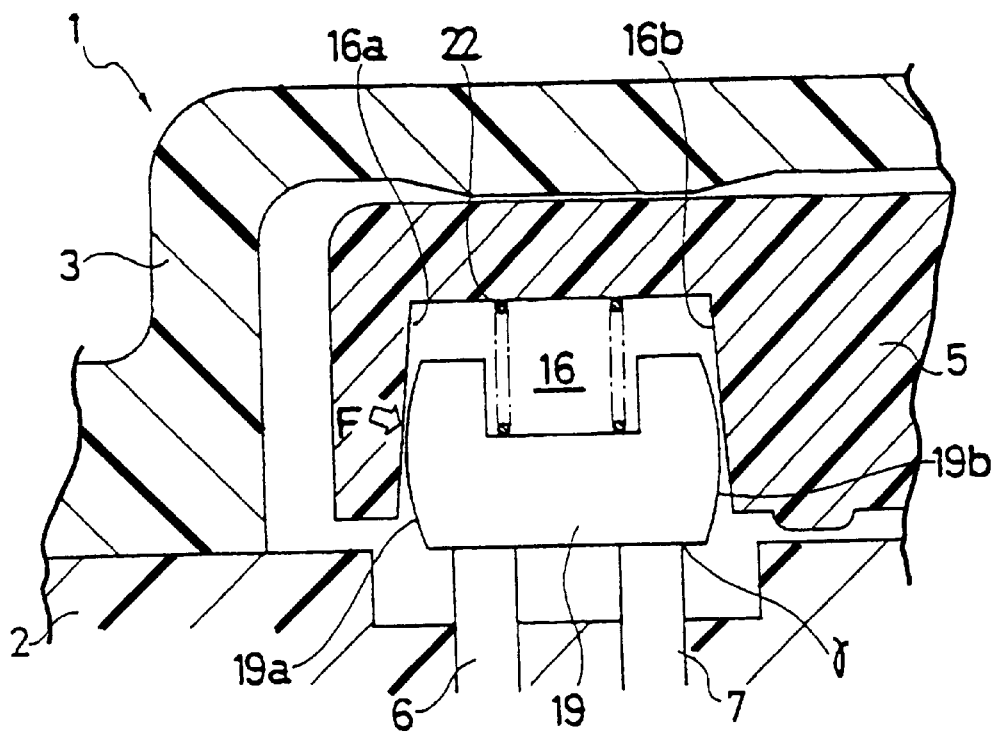
FIG. 5 is a sectional view similar to FIG. 1 but in accordance with a fifth preferred embodiment of the present invention.

As illustrated in FIG. 5, a fifth embodiment of the position detecting switch of the present invention includes opposite outside wall surfaces 19a, 19b of a first movable contact 19 having a profile of an arc of a circle with a predetermined radius. Although not shown in FIG. 5, second and third movable contacts 20, 21 are formed in substantially the same manner as the first movable contact 19. The remaining structure of the embodiment of FIG. 5 is substantially the same as those of the above-described conventional position detecting switch 1 of FIGS. 16 and 17.

In the thus-constructed position detecting switch 1 of FIG. 5 with the opposite outside wall surfaces 19a, 19b of the first movable contact 19 having arc surfaces, an external force F caused at the time of deformation of a sliding body 5 due to thermal contraction acts on the first movable contact 19 in the direction of a normal to the arc surface of the outside wall surface 19a of the first movable contact 19. More specifically, the vector of the external force F that acts on the outside wall surface 19a of the first movable contact 19 is in a downward direction. Since the direction of the vector of the external force F is generally directed toward a fulcrum γ, the rotating moment M caused in the first movable contact 19 by the external force F is reduced to a low level. When the sliding body 5 deforms due to thermal expansion so that an external force F is applied to the first movable contact 19, the external force F acts on the outside wall surface 19b of the first movable contact 19 in the direction of a normal to the arc surface, so that the rotating moment caused thereby is small. In this manner, tendency of the first movable contact 19 to incline when the sliding body 5 thermally expands or contracts is reduced, thereby preventing the first movable contact 19 from moved out of the contact with the first and second stationary contacts 6, 7 when the first movable contact 19 is set to such a contact position. Therefore, the movable contact 19 will reliably contact the first and second stationary contacts 6, 7, thereby achieving sufficient electrical conduction between the movable contact 19 and the first and second stationary contacts 6, 7. In a similar manner, sufficient electrical conduction between the second and third movable contacts 20, 21 and the corresponding stationary contacts can be achieved.

Figure 6:
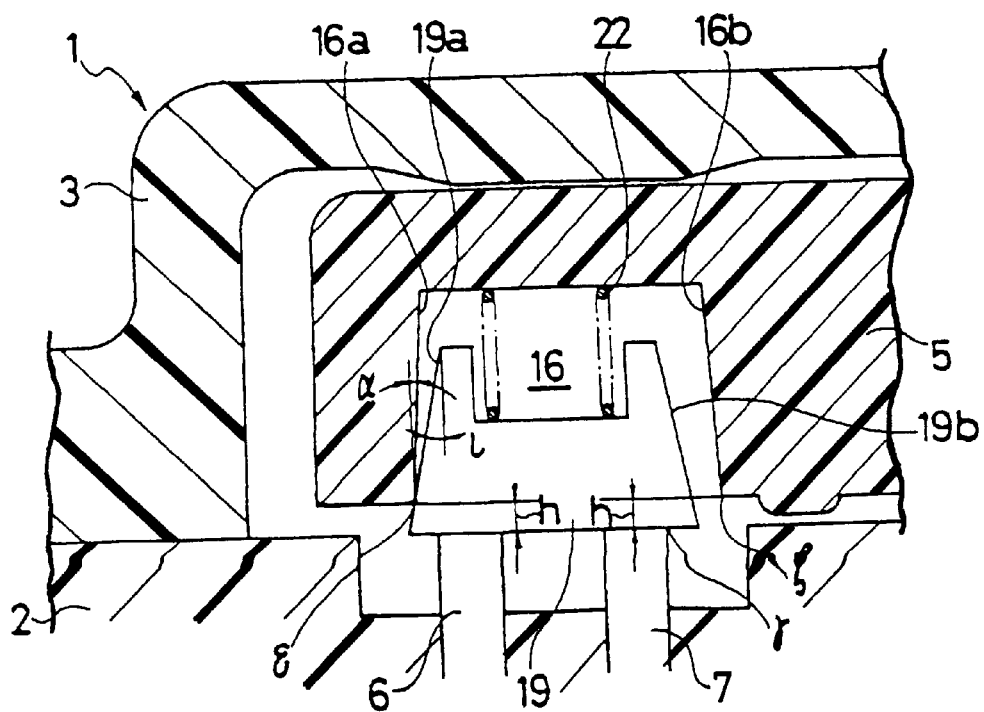
FIG. 6 is a sectional view similar to FIG. 1, but in accordance with a sixth preferred embodiment of the present invention.

As shown in FIG. 6, a sixth embodiment of the position detecting switch of the present invention includes opposite outside wall surfaces 19a, 19b of a first movable contact 19 inclined at an inclination angle ι such that the length of the first movable contact 19 in the longitudinal direction of a sliding body 5 increases progressing from an upper end to a lower end of the first movable contact 19. The inclination angle ι is greater than the draft taper angle α of opposite inside wall surfaces 16a, 16b of a first movable contact receptacle portion 16. The inclination angle ι lowers the height h above the stationary contacts 6, 7 of a point at which the first movable contact 19 is restricted from moving in the direction of the length of the sliding body 5. Although not shown in FIG. 6, second and third movable contacts 20, 21 are formed in substantially the same manner as the first movable contact 19. The remaining structure of this embodiment is substantially the same as that of the above-described conventional position detecting switch 1 of FIGS. 16 and 17.

In the thus-constructed position detecting switch 1 of FIG. 6 with the outside wall surface 19a of the first movable contact 19 inclined at the inclination angle $\iota$ and the inside wall surface 16a of the first movable contact receptacle portion 16 inclined at the draft taper angle $\alpha$ which is less than the angle $\iota$, an external force F caused at the time of deformation of the sliding body 5 due to thermal contraction is applied to the first movable contact 19 at a point $\epsilon$ at a reduced height h (that is, a lowest portion of the sliding body 5), so that the rotating moment M thereby caused in the first movable contact 19 by the external force is reduced to a low level. Similarly, since the outside wall surface 19b of the first movable contact 19 is inclined at the inclination angle $\iota$ and the inside wall surface 16b of the first movable contact receptacle portion 16 is inclined at the draft taper angle $\alpha$ which is less than the angle $\iota$, an external force F caused by deformation of the sliding body 5 due to thermal expansion is applied to the first movable contact 19 at a position $\zeta$ at a reduced height h (that is, a lowest portion of the sliding body 5), so that the rotating moment M thereby caused in the first movable contact 19 by the external force is also small. In this manner, tendency of the first movable contact 19 is reduced when the sliding body 5 thermally expands or contracts, thereby preventing the first movable contact 19 from moving out of the contact with the first and second stationary contacts 6, 7 when the first movable contact 19 is set to such a contact position. Therefore, the movable contact 19 will reliably contact the first and second stationary contacts 6, 7, thereby achieving sufficient electrical conduction between the movable contact 19 and the first and second stationary contacts 6, 7.

In a similar manner, sufficient electrical conduction between the second and third movable contacts 20, 21 and the corresponding stationary contacts can be achieved.

Figure 7:
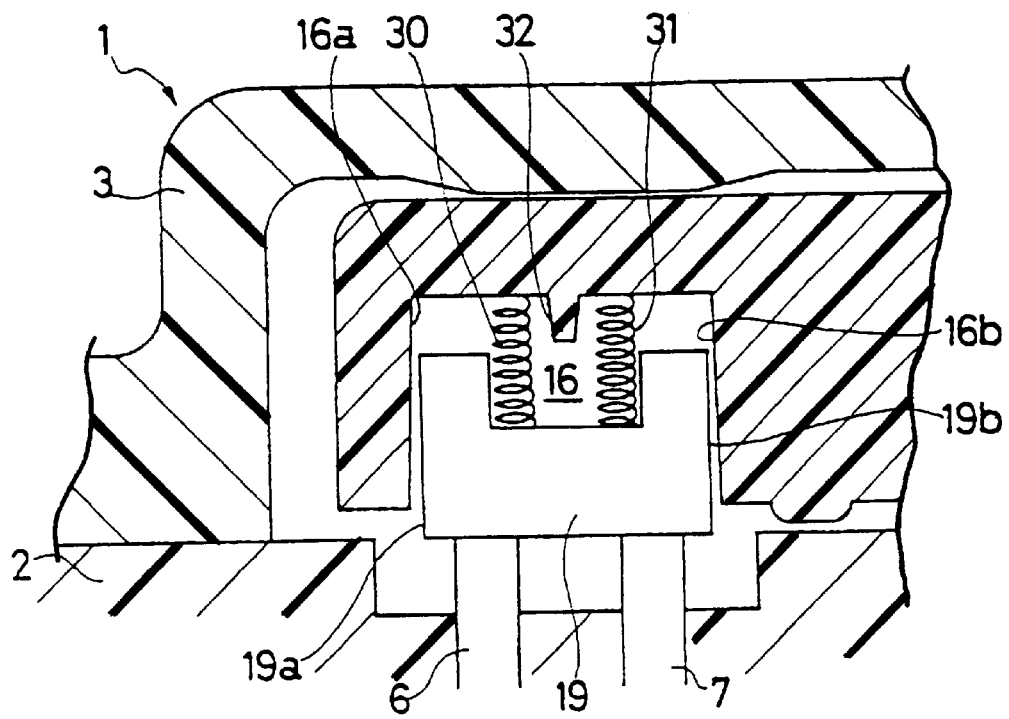
FIG. 7 is a sectional view similar to FIG. 1 but in accordance with a seventh preferred embodiment of the present invention.

A position detecting switch 1 of the seventh embodiment shown in FIG. 7 has an urging device for urging a first movable contact 19 toward first and second stationary contacts 6, 7, which is different from the first coil spring 22 in the conventional position detecting switch 1 of FIG. 18. In place of the first coil spring 22, two coil springs 30, 31 having a smaller coil diameter than the first coil spring 22 are disposed between an inside ceiling portion of the first movable contact receptacle portion 16 and an upper portion of a first movable contact 19. The coil springs 30, 31 are substantially aligned along the direction of the length of a sliding body 5. The coil springs 30, 31 are prevented from shifting in position by a positional deviation preventing protrusion 32 provided on the ceiling portion of the first movable contact receptacle portion 16. Although not shown in FIG. 7, second and third movable contact receptacle portions 17, 18 and corresponding springs are formed and disposed in substantially the same manner as the first movable contact receptacle portion 16 and the coil springs 30, 31. The remaining structure of the embodiment is substantially the same as that of the above-described conventional position detecting switch 1 of FIGS. 16 and 17.

Due to provision of the two coil springs 30, 31 in the thus-constructed position detecting switch 1 of FIG. 7, the first movable contact 19 receives spring loads at two locations in such a manner that the load from the coil spring 30 reliably provides a sufficient load for contact between the first movable contact 19 and the first stationary contact 6, and the load from the other coil spring 31 reliably provides a sufficient load for contact between the first movable contact 19 and the second stationary contact 7. The load centers of the two coil springs 30, 31 are fixed in position by the positional deviation preventing protrusion 32. In this manner, sufficient loads are reliably applied from the first movable contact 19 to the first and second stationary contacts 6, 7, so that the contact loads of the first movable contact 19 onto the first and second stationary contacts 6, 7 become stable and well-balanced. Therefore, even if a rotating moment M is caused in the first movable contact 19 by an external force F caused at the time of deformation of the sliding body due to thermal contraction or thermal expansion, the first movable contact 19 avoids inclining and reliably contacts the first and second stationary contacts 6, 7, thereby achieving sufficient electrical conduction between the movable contact 19 and the first and second stationary contacts 6, 7.

Furthermore, since the two coil springs 30, 31 apply loads respectively to two locations on the first movable contact 19, the interval between the load centers of the coil springs 30, 31 can be increased. Thereby, the seating of the first movable contact 19 on the first and second stationary contacts 6, 7 becomes more stable. Therefore, the first movable contact 19 reliably contacts the first and second stationary contacts 6, 7 without inclination, thereby achieving sufficient electric conduction between the movable contact 19 and the first and second stationary contacts 6, 7.

In a similar manner, sufficient electric conduction between the second and third movable contacts 20, 21 and the corresponding stationary contacts can be achieved. Alternatively, three or more coil springs for pressing the first movable contact 19 may be provided independently of one another.

Figure 8:
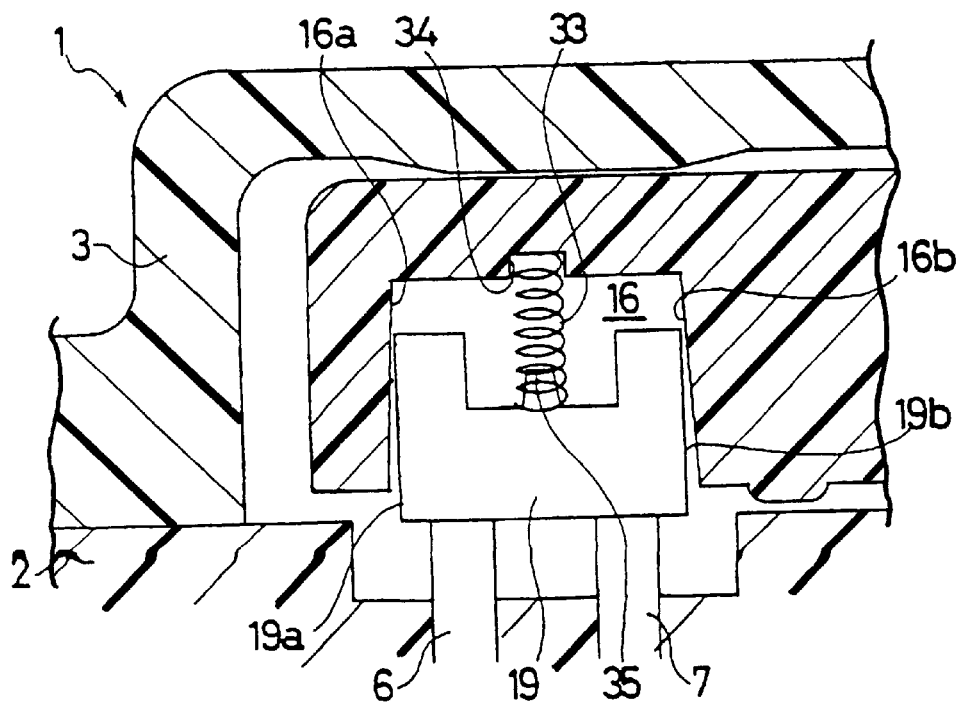
FIG. 8 is a sectional view similar to FIG. 1 but in accordance with an eighth preferred embodiment of the present invention.

In an eighth embodiment of the position detecting switch of the present invention shown in FIG. 8, an urging device for urging a first movable contact 19 toward first and second stationary contacts 6, 7 is different from the first coil spring 22 in the conventional position detecting switch 1 of FIG. 18. In place of the first coil spring 22, a coil spring 33 having a smaller coil diameter than the first coil spring 22 is disposed between an inside ceiling portion of the first movable contact receptacle portion 16 and an upper portion of a first movable contact 19. An end of the coil spring 33 is fitted into a positional deviation preventing recess 34 formed at substantially the center of the bottom portion of the first movable contact receptacle portion 16 in the direction of the length of a sliding body 5, and the other end of the coil spring 33 is fitted over a positional deviation preventing protrusion 35 provided at substantially the center of the upper portion of the first movable contact 19 in that lengthwise direction. Although not shown in FIG. 8, second and third movable contact receptacle portions 17, 18 and the corresponding springs are formed and disposed in substantially the same manner as the first movable contact receptacle portion 16 and the coil spring 33. The remaining structure of this embodiment is substantially the same as those of the above-described conventional position detecting switch 1.

In the thus-constructed position detecting switch 1 of FIG. 8, the coil spring 33 is prevented from shifting in position so that the load center of the coil spring 33 is regulated to a predetermined position and the load from the coil spring 33 is constantly applied to substantially the lengthwise center of the first movable contact 19. In this manner, sufficient loads are reliably applied from the first movable contact 19 to the first and second stationary contacts 6, 7, so that the contact loads of the first movable contact 19 onto the first and second stationary contacts 6, 7 become stable and well-balanced. Therefore, even if a rotating moment M is caused in the first movable contact 19 by an external force F from deformation of the sliding body due to thermal contraction or thermal expansion, the first movable contact 19 reliably contacts the first and second stationary contacts 6, 7 without inclination, thereby achieving sufficient electrical conduction between the movable contact 19 and the first and second stationary contacts 6, 7.

Furthermore, even if the first movable contact 19 is urged to incline due to a relatively small interval between the first and second stationary contacts 6, 7, the first movable contact 19 is prevented from inclining since the load from the coil spring 33 acts on substantially the lengthwise center of the first movable contact 19. Therefore, the first movable contact 19 reliably contacts the first and second stationary contacts 6, 7 as stated above, thereby achieving sufficient electrical conduction between the movable contact 19 and the first and second stationary contacts 6, 7.

In a similar manner, sufficient electric conduction between second and third movable contacts 20, 21 (not shown in FIG. 8) and the corresponding stationary contacts can be achieved.

Figure 9:
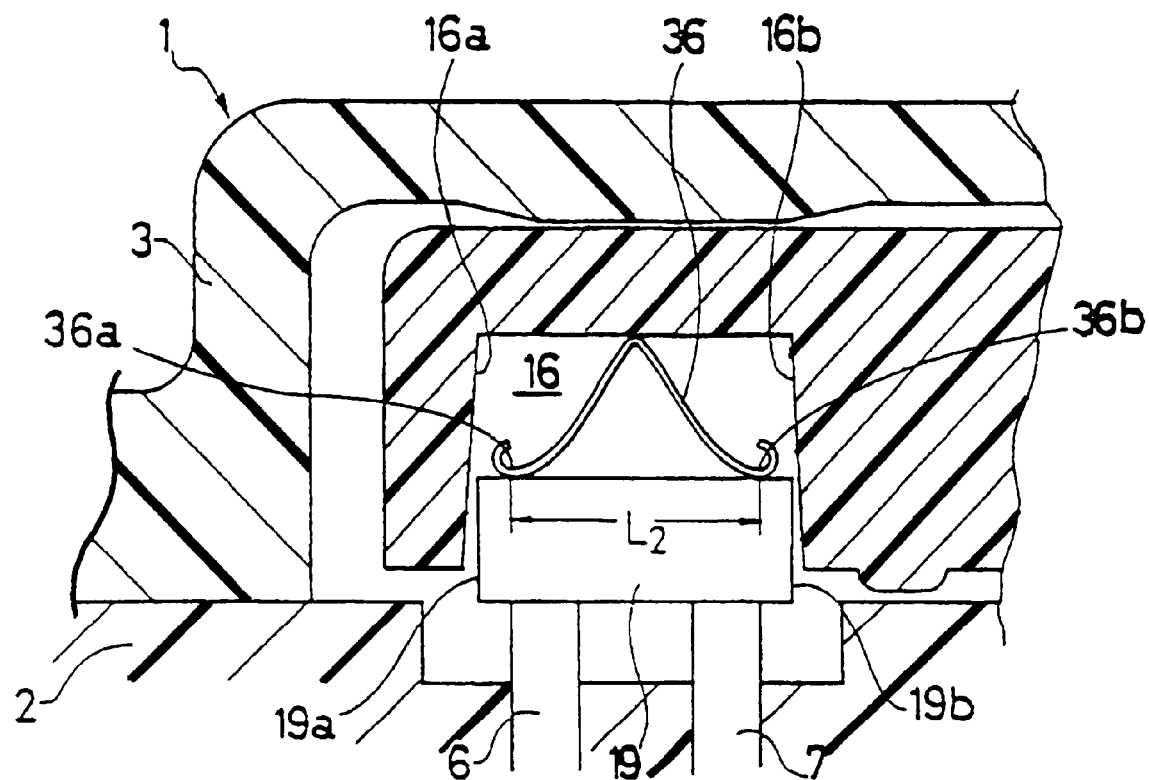
FIG. 9 is a section view similar to FIG. 1 but in accordance with a ninth preferred embodiment of the present invention.

FIG. 9 illustrates a further preferred or ninth embodiment of the position detecting switch of the present invention. An urging device for urging a first movable contact 19 toward first and second stationary contacts 6, 7 is different from the first coil spring 22 in the conventional position detecting switch 1 of FIG. 18. In place of the first coil spring 22, a leaf spring 36 extending in the direction of the length of a sliding body 5 is disposed between an inside ceiling portion of the first movable contact receptacle portion 16 and an upper portion of a first movable contact 19. The leaf spring 36 is bent at its substantially lengthwise center to form an inverted "V" shape. Opposite end portions of the leaf spring 36 are curved upward forming curved portions 36a, 36b. Thus, the leaf spring 36 is generally symmetric on the right-and-left basis in FIG. 9. The curved portions 36a 36b contact opposite end portions in the lengthwise direction on the upper surface of the first movable contact 19. In this manner, the load from the leaf spring 36 is applied to the first movable contact 19. That is, the load of the leaf spring 36 is applied to the first movable contact 19 at two locations thereon spaced by a relatively large interval L2.

Furthermore, since the curved portions at the opposite ends of the leaf spring 36 take positions adjacent to opposite inside wall surfaces 16a, 16b of the first movable contact receptacle portion 16, relatively large positional deviation of the leaf spring 36 in the lengthwise direction is prevented by the curved positions 36a, 36b abutting on the opposite inside wall surfaces 16a, 16b when the leaf spring 36 slightly shifts in position in the lengthwise direction. Although not shown in FIG. 9, second and third movable contacts 20, 21 and the corresponding springs are formed and disposed in substantially the same manner as the first movable contact 19 and the leaf spring 36. The remaining structure of the embodiment of FIG. 9 are substantially the same as those of the above-described conventional position detecting switch 1 of FIGS. 16 and 17.

In the thus-constructed position detecting switch 1 of FIG. 9, the load of the coil spring 36 is applied at two locations, that is, the curved portions 36a, 36b formed on the opposite end portions in the lengthwise direction. The interval L2 between the two load centers defined by the curved portions 36a, 36b is relatively long, and the leaf spring 36 is substantially prevented from shifting in position in the lengthwise direction. Therefore, a deviation of the load centers of the leaf spring 36 onto the first movable contact 19 becomes unlikely to occur. In this manner, sufficient loads are reliably applied from the first movable contact 19 to the first and second stationary contacts 6, 7, so that the contact loads of the first movable contact 19 onto the first and second stationary contacts 6, 7 become stable and well-balanced. Therefore, even if a rotating moment M is caused in the first movable contact 19 by an external force F caused at the time of deformation of the sliding body due to thermal contraction or thermal expansion, the first movable contact 19 hardly inclines but reliably contacts the first and second stationary contacts 6, 7, thereby achieving sufficient electrical conduction between the movable contact 19 and the first and second stationary contacts 6, 7.

Furthermore, since the curved portions 36a, 36b of the leaf spring 36 apply spring loads respectively to two locations on first movable contact 19, the interval between the load centers defined by the curved portions 36a, 36b of the leaf spring 36 can easily be increased by increasing the interval between the curved portions 36a, 36b. Thereby, the seating of the first movable contact 19 on the first and second stationary contacts 6, 7 becomes more stable. Therefore, the first movable contact 19 reliably contacts the first and second stationary contacts 6, 7 without inclination, thereby achieving sufficient electric conduction between the movable contact 19 and the first and second stationary contacts 6, 7.

In a similar manner, sufficient electric conduction between the second and third movable contacts 20, 21 and the corresponding stationary contacts can be achieved.

Figure 10A:
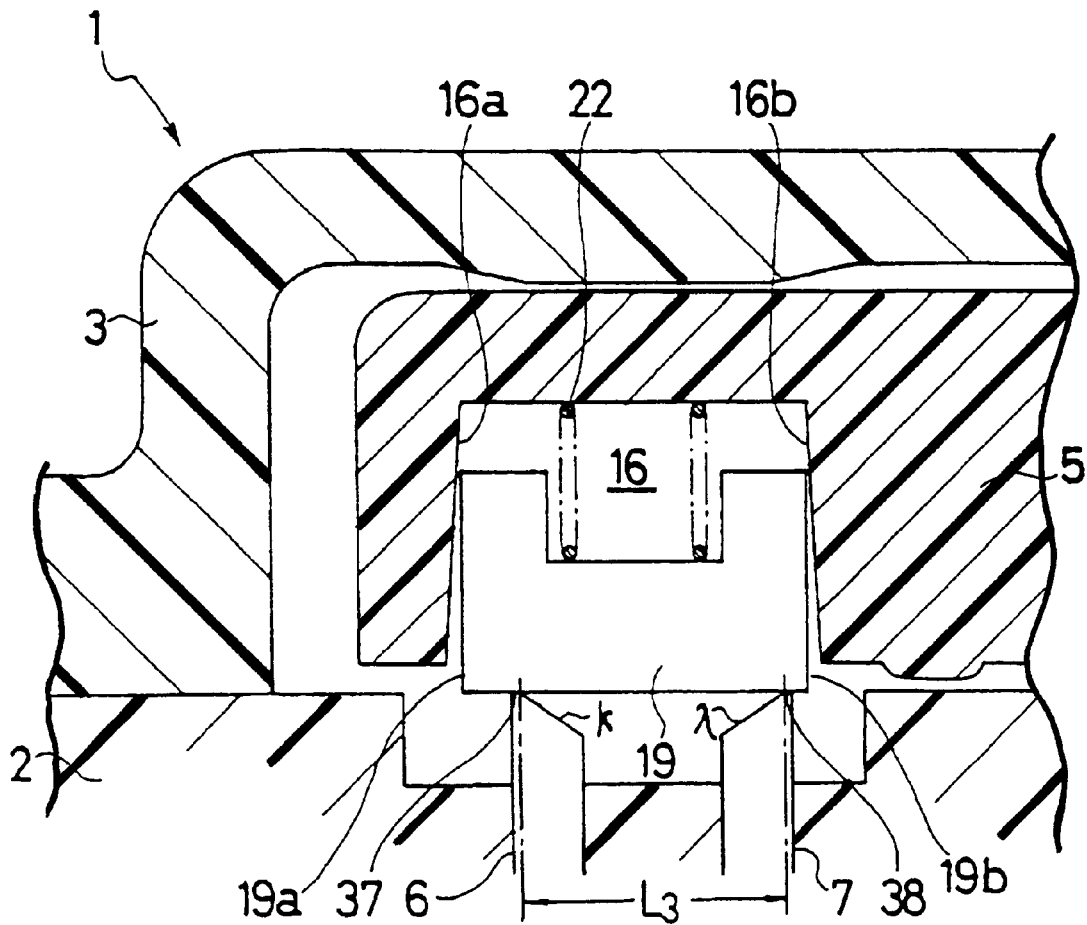
FIG. 10a is a sectional view similar to FIG. 1 but in accordance with a tenth preferred embodiment of the present invention.
Figure 10B:
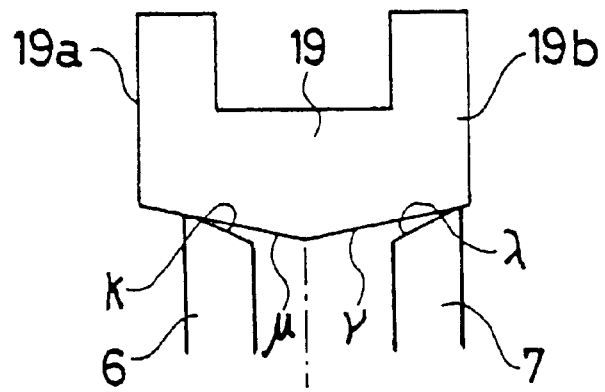

FIG. 10a shows a tenth embodiment of the position detecting switch of the present invention. FIG. 10b illustrates a modification of the embodiment shown in FIG. 10a.

In FIG. 10a, first and second stationary contacts 6, 7 have tapered surfaces κ, λ, respectively, which extend from top surfaces of the stationary contacts 6, 7 that contact the first movable contact 19. Each tapered surface extends from a small top surface that is formed on a side of the stationary contact remote from the other stationary contact, and each tapered surface is inclined toward the other stationary contact.

Although not shown in FIG. 10a, third to eighth stationary contacts 8, 9, 10, 11, 12, 13 are formed in substantially the same manner as the first and second stationary contacts 6, 7. The remaining structure of the embodiment of FIG. 10a is substantially the same as that of the above-described conventional position detecting switch 1 of FIGS. 16 and 17.

In the thus-constructed position detecting switch 1 of FIG. 10a, each of the first and second stationary contacts 6, 7 is provided with the top tapered surface κ or λ inclined toward the other stationary contact, the first movable contact 19 contacts the small top surface of each of the first and second stationary contacts 6, 7 formed on the side remote from the other stationary contact. Thus, the interval L3 between contact points 37, 38 between the first movable contact 19 and the first and second stationary contacts 6, 7 is increased, so that the seating of the first movable contact 19 on the first and second stationary contacts 6, 7 becomes more stable.

Therefore, the first movable contact 19 does not incline but reliably contacts the first and second stationary contacts 6, 7, thereby achieving sufficient electrical conduction between the movable contact 19 and the first and second stationary contacts 6, 7.

In a similar manner, sufficient electrical conduction between second and third movable contacts 20, 21 (not shown in FIG. 10a) and the corresponding stationary contacts can be achieved.

The contact surfaces of the first movable contact 19 with the first and second stationary contacts 6, 7 may also be formed as tapered surfaces μ, ν that are inclined downward toward a central portion of the first movable contact 19 in the lengthwise direction as shown in FIG. 10b. The gradient of the tapered surfaces μ, ν is less than the gradient of the tapered surfaces κ, λ. The taper surfaces thus formed on μ, ν on the first movable contact 19 regulate the position of the first movable contact 19 so that if the first movable contact 19 shifts in position, the position deviation is automatically corrected.

Figure 11A:
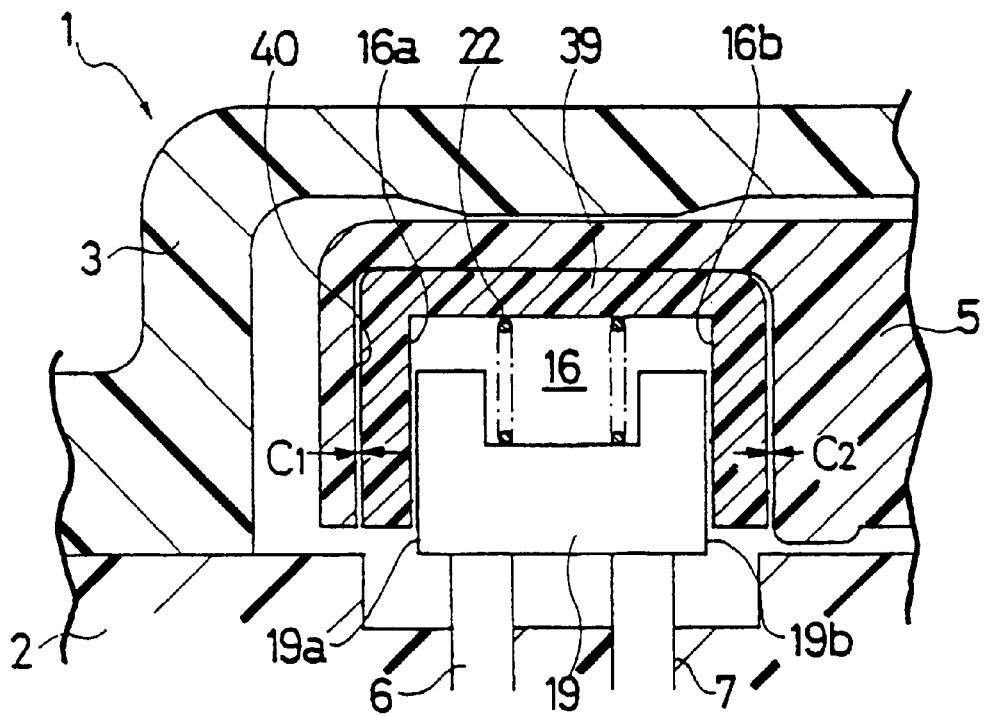
FIG. 11a is a sectional view similar to FIG. 1 but in accordance with an eleventh preferred embodiment of the present invention.
Figure 11B:
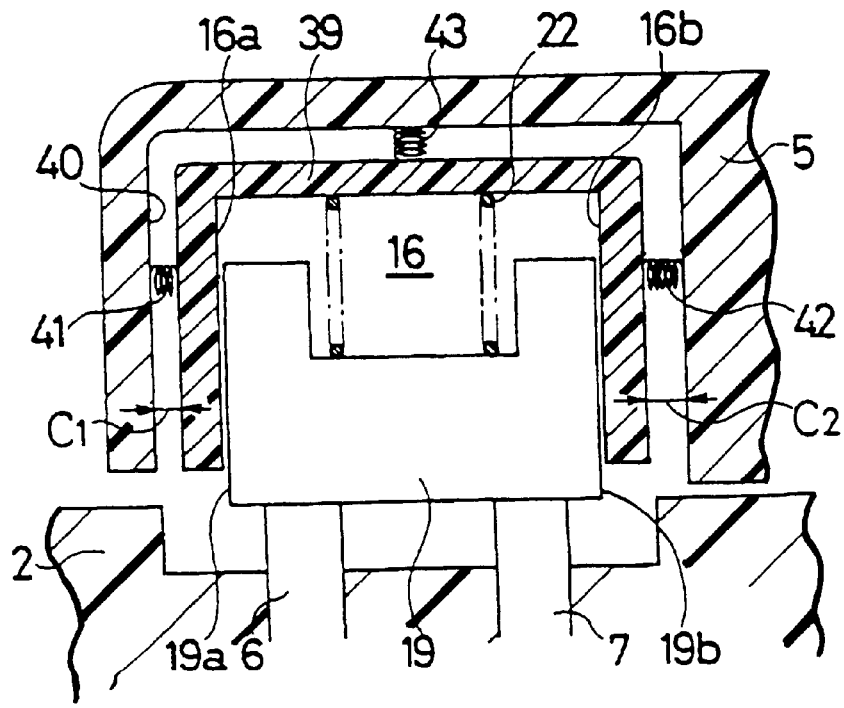

FIG. 11a shows an eleventh embodiment of the position detecting switch of the present invention. FIG. 11b illustrates a modification of the embodiment shown in FIG. 11a.

In the position detecting switch 1 of FIG. 11a, a case or auxiliary receptacle member 39 for receiving a first movable contact 16 is provided separately from the sliding body 5. The case 39 is disposed in a recess 40 (that is, a movable contact receptacle portion) formed in the sliding body 5. The length of the recess 40 in the direction of the length of the sliding body 5 is greater than the length of the case 39 in the lengthwise direction, so that predetermined clearances c1, c2 are formed between inside wall surfaces of the recess 40 and outside wall surfaces of the case 39. Although not shown in FIG. 11a, second and third movable contact receptacle portions 17, 18 are formed in substantially the same manner as the first movable contact receptacle portion 16. The remaining structure of this embodiment is substantially the same as that of the above-described conventional position detecting switch 1 of FIGS. 16 and 17.

In the thus-constructed position detecting switch 1 of FIG. 11a, the case 39 for receiving the first movable contact 19 is disposed in the recess 40 of the sliding body 5, with the clearances c1, c2 formed between the inside wall surfaces 40 and the outside wall surfaces of the case 39. Deformation of the sliding body 5 due to thermal expansion or thermal contraction is absorbed by the clearances c1, c2 and therefore will not substantially affect the case 39. Furthermore, since the length of the case 39 in the lengthwise direction is much smaller than the length of the sliding body 5, deformation of the case 39 due to thermal expansion or thermal contraction is also smaller. Therefor, the effect of thermal expansion or thermal contraction of the sliding body 5 on the first movable contact 19 is reduced, so that substantially no rotating moment M caused by an external force F occurs in the first movable contact 19. Therefore, the first movable contact 19 does not incline and reliably contacts the first and second stationary contacts 6, 7 even if the sliding body 5 thermally expands or contracts, thereby achieving sufficient electrical conduction between the movable contact 19 and the first and second stationary contacts 6, 7. In a similar manner, sufficient electrical conduction between second and third movable contacts 20, 21 (not shown in FIG. 11a) and the corresponding stationary contacts can be achieved.

Springs 41, 42, 43 for maintaining clearances may be disposed between the inside wall surfaces and ceiling surface of the recess 40 of the sliding body 5 and the outside wall surfaces and top surface of the case 39 as shown in FIG. 11b. The springs 41, 42, 43 thus disposed reliably maintain clearances between the inside wall surfaces and ceiling surface of the recess 40 of the sliding body 5 and the outside wall surfaces and top surface of the case 39, thereby more reliably reducing the effect of thermal expansion or thermal contraction of the sliding body 5 on the first movable contact 19.

Figure 12:
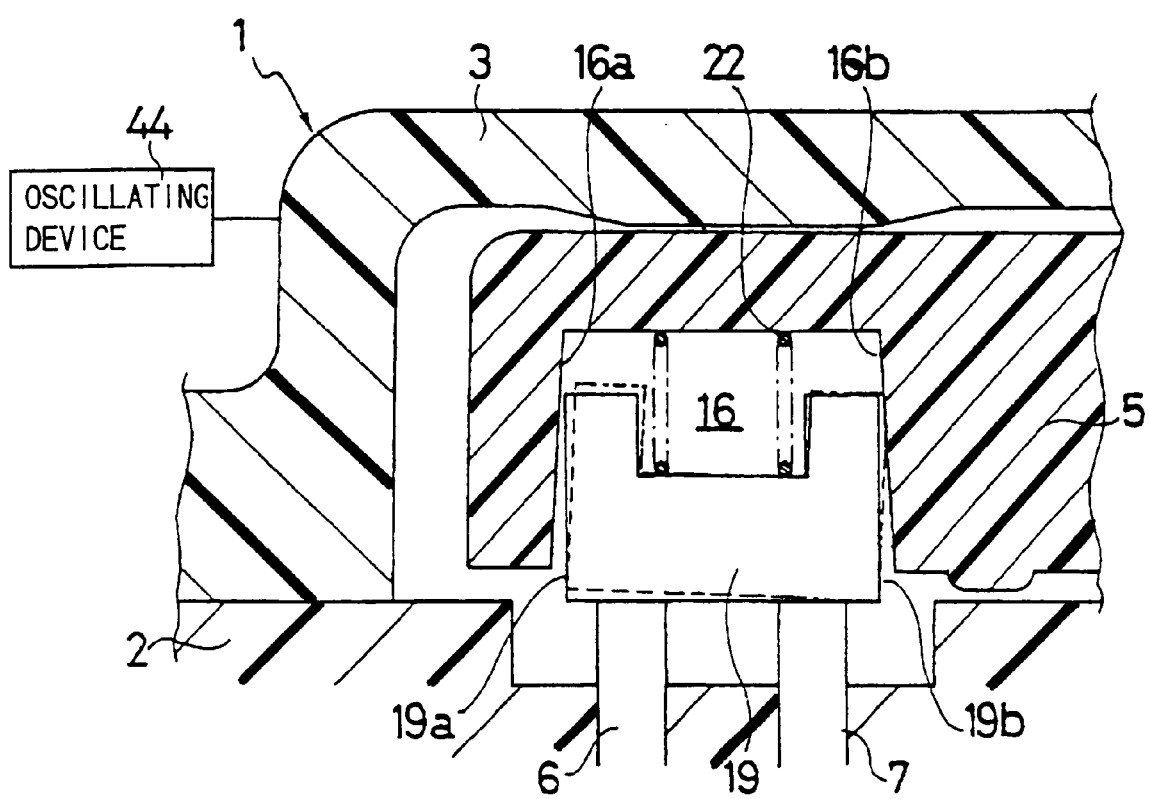
FIG. 12 is a sectional view similar to FIG. 1 but in accordance with a twelfth preferred embodiment of the present invention.

A twelfth embodiment of the position detecting switch of the present invention is shown in FIG. 12 and includes an oscillating device 44 for oscillating the position detecting switch 1 for a predetermined length of time. The oscillating device 44 may be formed by, for example, a shift lock solenoid or a door lock solenoid (not shown). However, it should be understood that the oscillating device 44 may be formed in any manner as along as it oscillates the position detecting switch 1.

In the thus-constructed position detecting switch 1 of FIG. 12, the oscillating device 44 oscillates the position detecting switch 1 for a predetermined length of time. Even if an inside wall surface of a first movable contact receptacle portion 16 has been brought into contact with a first movable contact 19 by thermal expansion or thermal contraction of a sliding body 5 so that the first movable contact 19 is held in an inclined posture by a rotating moment M caused in the first movable contact 19 due to an external force F from the sliding body 5, oscillation of the position detecting switch 1 produced by the oscillating device 44 releases the first movable contact 19 out of the contact with the inside wall surface of the first movable contact receptacle portion 16 so that the rotating moment M is eliminated and, therefor, the first movable contact 19 returns from the inclined posture to a proper posture. In this manner, even if the sliding body 5 thermally expands or contracts, the movable contact 19 will reliably contact the first and second stationary contacts 6, 7, thereby achieving sufficient electrical conduction between the movable contact 19 and the first and second stationary contacts 6, 7.

In a similar manner, sufficient electrical conduction between second and third movable contacts 20, 21 (not shown in FIG. 12) and the corresponding stationary contacts can be achieved.

Figure 13A:
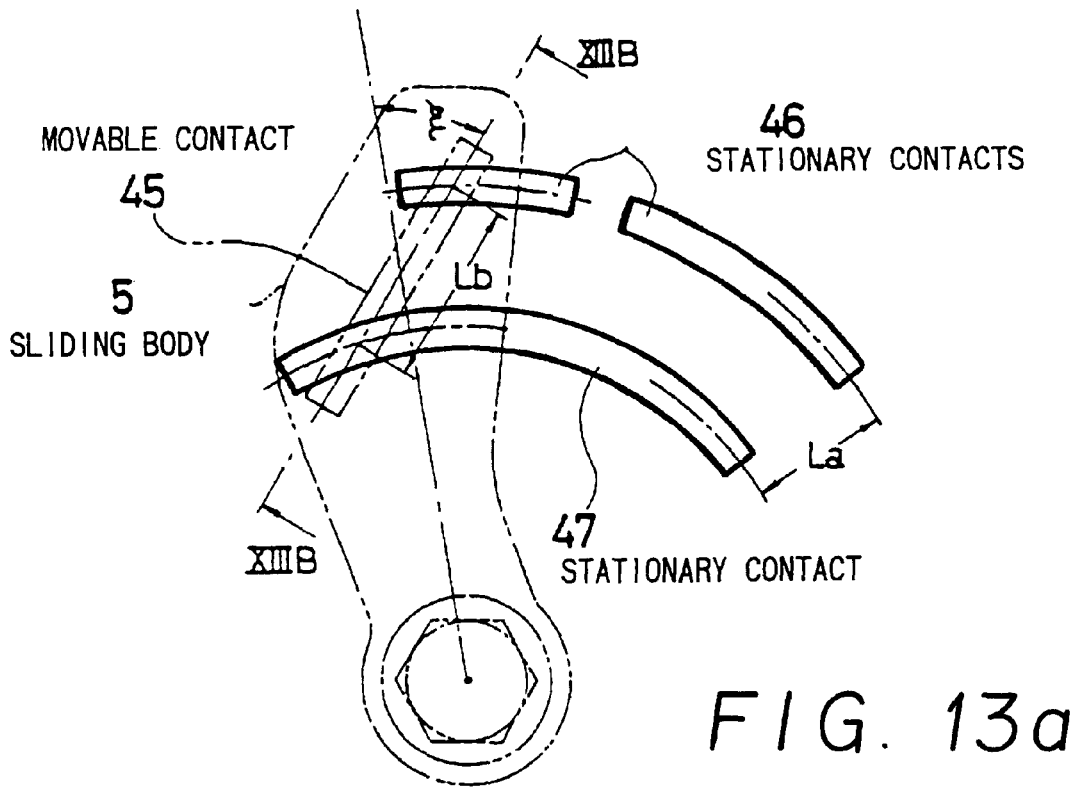
FIG. 13a is a plan view of a broken-away portion of a range position detecting switch in an automatic transmission in accordance with a thirteenth embodiment of the present invention.
Figure 13B:
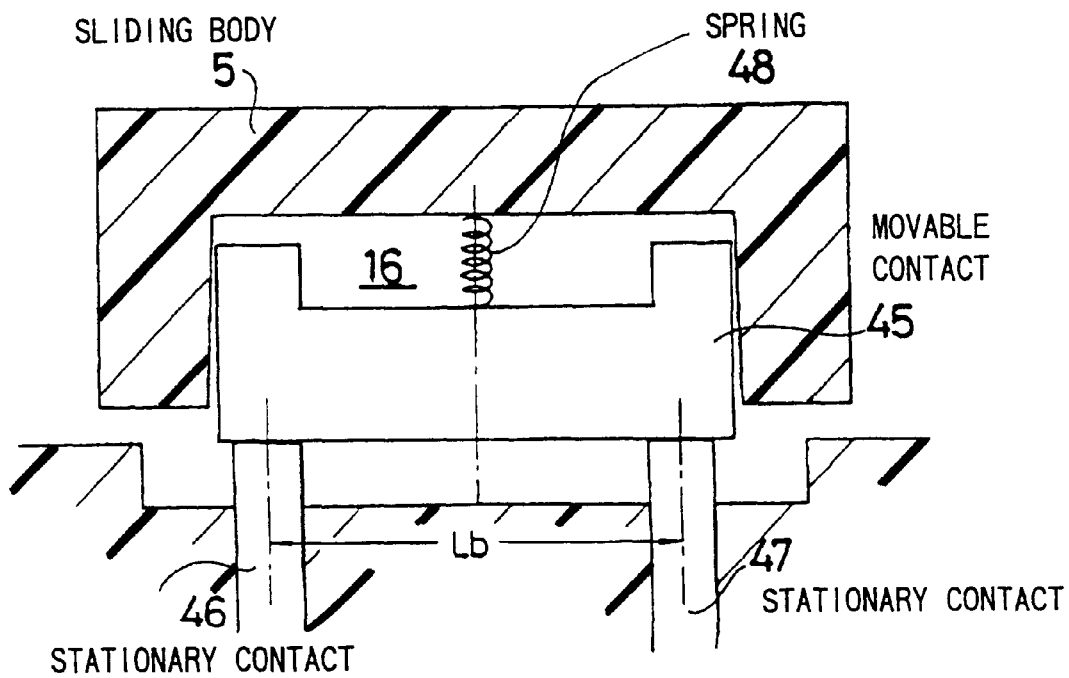

FIGS. 13a and 13b illustrate a thirteenth embodiment of the position detecting switch of the present invention.

In the foregoing embodiments and the conventional art, the longitudinal dimension of the movable contact is disposed along the longitudinal direction of the sliding body 5, that is, in the direction of a radius of arc-shaped stationary contacts. In FIG. 13a, a movable contact 45 of a position detecting switch 1 extends in a direction at a predetermined acute angle ξ to the longitudinal direction of the sliding body 5, that is, in a direction oblique to the direction of a radius of a pair of arc-shaped stationary contacts 46, 47.

In the thus-constructed position detecting switch 1 of FIG. 13a, the movable contact 45 is angled to the direction of the length of the sliding body 5 at the predetermined angle ξ as indicated in FIG. 13a. Therefore, the interval Lb between contact points, indicated in FIG. 13b, of the movable contact 45 with a pair of stationary contacts 46, 47 becomes greater than the interval La between the stationary contacts 46, 47 in a radial direction. Thereby, an increase of the interval Lb between the contact points of the movable contact 45 and the stationary contacts 46, 46 is secured even if it is impossible to increases the interval La between the stationary contacts 46, 47 in a radial direction due to restrictions on a radial dimension of the position detecting switch 1, or the like.

Figure 14:
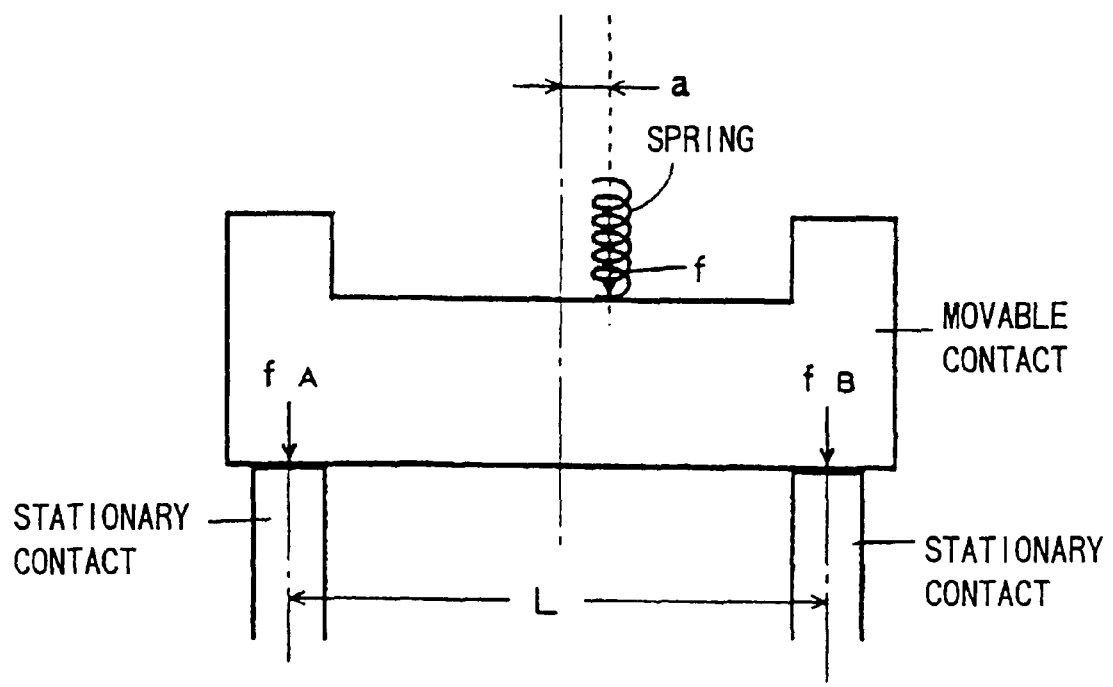
FIG. 14 is a diagram illustrating the relationship between the interval between stationary contacts and the deviation of a spring load on a movable contact.

If the load center of a spring urging a movable contact deviates by a deviation amount a to one side as indicated in FIG. 14, forces $f_A$, $f_B$ applied to stationary contacts from the movable contact are generally expressed as:

$$f_A : f_B = \{(L/2) - a\} : \{(L/2) + a\} \qquad (I)$$

In accordance with mathematical expression (I), the effect of the deviation a of the load center reduces as the interval L between the two stationary contacts increases. Thus, this expression indicates that as the interval L is increased, the balance between the spring loads becomes better.

Consequently, since the interval Lb between the contact points of the movable contact 45 with the stationary contacts 46, 47 is increased as indicated in FIGS. 13a and 13b, the position detecting switch 1 of this embodiment has the ability to maintain good balance between the loads of a spring 48 onto the stationary contacts 46, 47 even if the load center of the spring 48 deviates, without requiring an increase of the interval La between the stationary contacts 46, 47 in a radial direction. Therefore, the movable contact 45 reliably contacts the stationary contacts 46, 47 without inclination even if a deviation a of the load center of the spring 48 occurs, thereby achieving sufficient electrical conduction between the movable contact 45 and the first and second stationary contacts 46, 47.

Furthermore, since there is no need to increase the interval La between the stationary contacts 46, 47, the position detecting switch 1 of this embodiment can be easily formed based on the size and construction of a conventional position detecting switch.

The deformation of the sliding body 5 due to thermal expansion or thermal contraction is great in magnitude in the direction of the length of the sliding body 5. However, since the movable contact 45 is angled to the lengthwise direction, the effect of thermal expansion and thermal contraction of the sliding body 5 on the movable contact 45 is reduced, so that substantially no rotating moment M by an external force F from the sliding body 5 occurs in the movable contact 45. Therefore, the movable contact 45 does not incline but reliably contacts the stationary contacts 46, 47 even if the sliding body 5 thermally expands or contracts, thereby achieving sufficient electric conduction between the movable contact 45 and the first and second stationary contacts 46, 47.

Figure 15A:
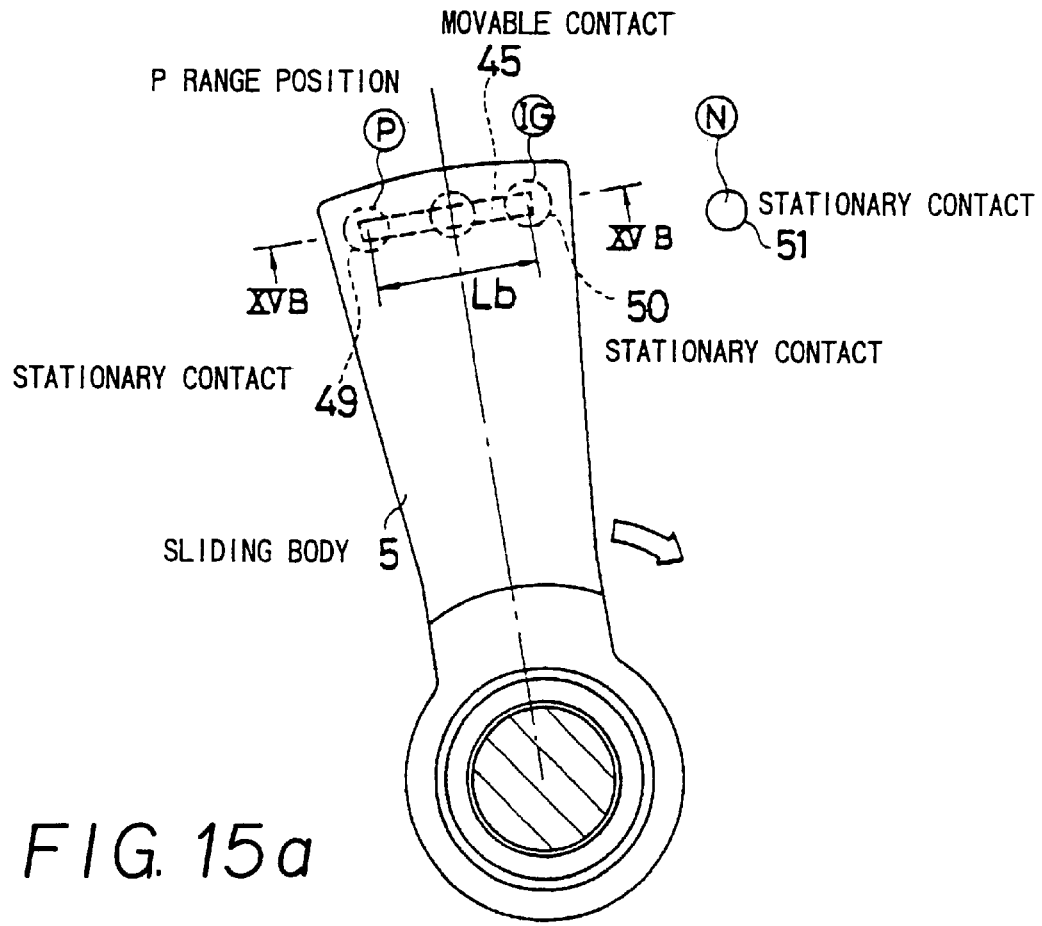
FIG. 15a is a plan view of a broken-away portion of a range position detecting switch in an automatic transmission in accordance with a fourteenth embodiment of the present invention.
Figure 15B:
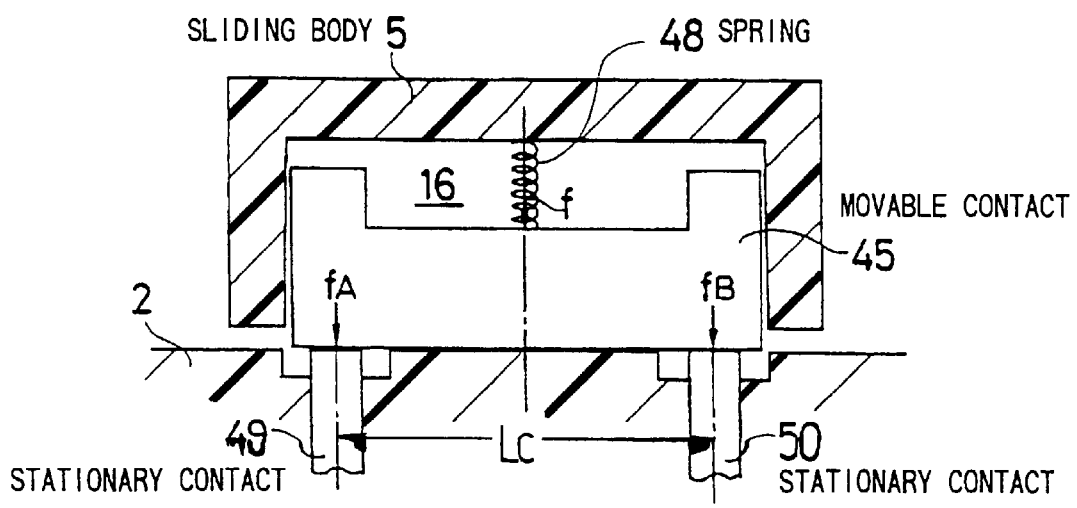

FIGS. 15a and 15b illustrate a thirteenth embodiment of the position detecting switch of the present invention.

While the position detecting switch 1 shown in FIGS. 13a and 13b has the longitudinal dimension of the movable contact 45 angled to the direction of the longitudinal dimension of the sliding body 5 at the predetermined angle ξ, a movable contact 45 of a position detecting switch 1 of FIGS. 15a and 15b extends perpendicular to the longitudinal dimension of the sliding body 5, that is, the predetermined angle ξ is 90°. Furthermore, three stationary contacts 49, 50, 51 are disposed in a manner of islands aligned in a circumferential direction.

In the thus-constructed position detecting switch 1 of FIGS. 15a and 15b, the movable contact 45 is disposed perpendicularly to the direction of the length of the sliding body 5. The possibility that the movable contact 45 will be affected by deformation of the sliding body 5 due to thermal expansion or thermal contraction, which is great in magnitude in the lengthwise direction, is considerably reduced, so that substantially no rotating moment M by an external force from the sliding body 5 occurs in the movable contact 45. Therefore, the movable contact 45 avoids being inclined and reliably contacts the stationary contacts 49, 50 even if the sliding body 5 thermally expands or contracts, thereby achieving sufficient electrical conduction between the movable contact 45 and the first and second stationary contacts 49, 50.

Furthermore, since the stationary contacts 49, 50, 51 are aligned in a circumferential direction in accordance with the right-angled placement of the movable contact 45, that is, the predetermined angle ξ being 90°, it becomes possible to increase the interval Lc between the stationary contacts 49, 50, 51. Thereby, the seating of the movable contact 45 on, for example, the stationary contacts 49, 50, becomes more stable, as indicated in FIG. 15b. Therefore, the movable contact 45 reliably contacts the stationary contacts 49, 50 without inclination even if the load center of a spring 48 deviates, thereby achieving sufficient electrical conduction between the movable contact 45 and the first and second stationary contacts 49, 50.

While the present invention has been described with reference to embodiments wherein the present invention is applied to a position detecting switch for detecting range positions in an automatic transmission, the present invention is not limited to such application, but may be applied to any position detecting switch that has a movable contact disposed in a movable contact receptacle portion formed in a sliding body, and a stationary contact. Furthermore, it is to be understood that the invention is not limited to the disclosed embodiment or structures. To the contrary, the invention is intended to cover various modifications and equivalent arrangements included within the spirit and scope of the appended claims.

What is claimed is:

1. A position detecting switch comprising:

a casing;

at least two stationary contacts mounted in the casing, each stationary contact presenting a contact surface within a contact plane at a predetermined position;

a sliding body having a contact receptacle formed therein and mounted for sliding movement on the casing over the predetermined position, said contact receptacle being defined in part by side walls extending in a direction generally normal to the contact plane;

a movable contact freely disposed in the contact receptacle for sliding movement therein and having a contact surface for simultaneously engaging at least two stationary contacts at said predetermined position and for disengaging the stationary contacts by sliding movement of the sliding body relative to said casing, said movable contact being sized relative to said contact receptacle to provide, between said movable contact and said side walls, a predetermined clearance whereby contact by one of said side walls would produce a rotating moment tending to cant the movable contact relative to said stationary contacts, which rotating moment would break contact between one of said stationary contacts and said movable contact, with said movable contact located at said predetermined position; and relative rotating moment inhibiting means for inhibiting the rotating moment of the movable contact relative to the substantially stationary contact and to thereby prevent the breaking of contact between the contact surface of the movable contact and the contact surface of the one stationary contact when the sliding body is in a position where the movable contact engages the stationary contact.

2. A position detecting switch according to claim 1, wherein the relative rotating moment inhibiting means comprises elastic means for independently urging the stationary contacts toward the movable contact.

3. A position detecting switch according to claim 1, wherein said relative rotating moment inhibiting means is elastic means for urging the movable contact toward the stationary contacts by constantly applying a load to substantially the middle of the movable contact relative to the sidewalls.

4. A position detecting switch according to claim 1, wherein said rotating moment inhibiting means comprises elastic means for urging the movable contact toward the stationary contacts by applying loads to the movable contact at a plurality of spaced locations on a surface of the movable contact opposite and parallel to the contact surface of the movable contact.

5. A position detecting switch according to claim 1, wherein said sliding body is rotatable fixed to said casing at a pivot point, for sliding and rotating movement about said pivot point relative to said casing, said at least two stationary contacts presenting arcuate contact surfaces which are radially distanced from each other relative to said pivot point, and wherein the relative rotating moment inhibiting means is a spacing between contact positions at which the movable contact respectively contacts the said at least two substantially stationary contacts, which spacing is greater than the radial distance between said at least two stationary contacts.

6. A position detecting switch according to claim 5, wherein said sliding body extends radially from said pivot point to define a longitudinal axis and wherein the movable contact is angled at a predetermined angle relative to said longitudinal axis.

7. A position detecting switch according to claim 6, wherein said predetermined angle is substantially 90°.

8. A position detecting switch according to claim 1, wherein the relative rotating moment inhibiting means comprises an auxiliary receptacle member which is provided in the contact receptacle of the sliding body, within said predetermined clearance, the auxiliary receptacle member receiving the movable contact.

9. A position detecting switch according to claim 1 wherein the relative rotating moment inhibiting means is oscillating means for vibrating said sliding body to release contact between said moveable contact and said side walls.

10. A position detecting switch according to claim 1 wherein said contact surface of said movable contact is a planar surface which remains in parallel with the contact plane as the movable contact slides within said contact receptacle.

11. A position detecting switch comprising:

a casing;

at least two stationary contacts mounted in the casing, each stationary contact presenting a contact surface within a contact plane at a predetermined position;

a sliding body having a contact receptacle formed therein and mounted for sliding movement on the casing over the predetermined position, said contact receptacle being defined in part by side walls extending in a direction generally normal to the contact plane;

a movable contact freely disposed in the contact receptacle for sliding movement therein and having a contact surface for simultaneously engaging at least two stationary contacts at said predetermined position and for disengaging the stationary contacts, by sliding movement of the sliding body relative to said casing, said movable contact being sized relative to said contact receptacle to provide, between said movable contact and said side walls, a predetermined clearance whereby contact by one of said side walls would produce a rotating moment tending to cant the movable contact relative to said stationary contacts, which rotating moment would break contact between one of said stationary contacts and said movable contact, with said movable contact located at said predetermined position; and relative rotating moment reducing means for reducing the rotating moment of the movable contact relative to the substantially stationary contact and to thereby prevent the breaking of contact between the contact surface of the movable contact and the contact surface of the one stationary contact when the sliding body is in a position where the movable contact engages the stationary contact.

12. A position detecting switch according to claim 11, wherein the relative rotating moment reducing means comprises a lid covering an opening of said contact receptacle, said lid having an opening larger by a first predetermined amount than the contact surface of said movable contact, and smaller by a second predetermined amount than the opening of the contact receptacle.

13. A position detecting switch according to claim 11 wherein said relative rotating moment reducing means comprises a tapered configuration of the side walls whereby said clearance at an opening of the contact receptacle is less than said clearance at a closed bottom of said contact receptacle.

14. A position detecting switch according to claim 11 wherein said relative rotating moment reducing means comprises side walls of said moveable contact configured as arcs of a circle confronting the side walls of said contact receptacle.

15. A position detecting switch according to claim 11 wherein said relative rotating moment reducing means comprises a tapered configuration of side walls of said movable contact confronting the side walls of the contact receptacle whereby the dimensions of the contact surface of said movable contact are larger than the corresponding dimensions of its end opposite its contact surface.

16. A position detecting switch according to claim 11 wherein the contact surface of said movable contact has a central protrusion and at least one surface portion tapered from said central protrusion in a direction away from said stationary contacts.

17. A position detecting switch according to claim 11 wherein said stationary contacts have contact surfaces tapered toward each other and away from the contact plane.

18. A position detecting switch according to claim 16 wherein said stationary contacts have contact surfaces tapered toward each other and away from the contact plane.

* * * * *